US012719188B2

(12) United States Patent
Nozaki et al.

(10) Patent No.: US 12,719,188 B2
(45) Date of Patent: Aug. 25, 2026

(54) BOARD CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Shinji Nozaki, Mie (JP); Hideto Nakamura, Mie (JP); Daisuke Saito, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 301 days.

(21) Appl. No.: 18/290,275

(22) PCT Filed: Mar. 23, 2022

(86) PCT No.: PCT/JP2022/013348
§ 371 (c)(1),
(2) Date: Nov. 10, 2023

(87) PCT Pub. No.: WO2022/244452
PCT Pub. Date: Nov. 24, 2022

(65) Prior Publication Data

US 2024/0275088 A1 Aug. 15, 2024

(30) Foreign Application Priority Data

May 21, 2021 (JP) ................................ 2021-085922

(51) Int. Cl.
*H01R 12/71* (2011.01)
*H01R 12/70* (2011.01)
*H01R 13/04* (2006.01)

(52) U.S. Cl.
CPC ....... *H01R 12/714* (2013.01); *H01R 12/7029* (2013.01); *H01R 12/7082* (2013.01); *H01R 13/04* (2013.01)

(58) Field of Classification Search
CPC .............. H01R 12/714; H01R 12/7029; H01R 12/7082; H01R 13/04
See application file for complete search history.

(56) References Cited

U.S. PATENT DOCUMENTS

2003/0171030 A1* 9/2003 Jones ................ H01R 12/7047 439/567
2005/0221668 A1* 10/2005 Hara .................. H01R 12/7029 439/567
2019/0058271 A1* 2/2019 Ryu .................. H01R 13/2478

FOREIGN PATENT DOCUMENTS

JP S55-149270 U1 10/1980
JP 2000-113928 A 4/2000
JP 2000133342 A * 5/2000

OTHER PUBLICATIONS

English translation of JP 2000-133342 A (Year: 2000).*
International Search Report issued on May 31, 2022 for WO 2022/244452 A1 (4 pages).

* cited by examiner

*Primary Examiner* — Sean Gugger
(74) *Attorney, Agent, or Firm* — Venjuris, P.C.

(57) ABSTRACT

It is aimed to enable a terminal fitting to be easily removed from a circuit board. A board connector (10) is provided with a terminal fitting (30) and a housing (20) in which the terminal fitting (30) is mounted, and fixed to a circuit board (12). The terminal fitting (30) includes a support receiving (Continued)

portion (32) to be supported by the housing (20), a connecting portion (34) to be connected to the circuit board (12), and a resiliently deformable resilient portion (33) provided between the support receiving portion (32) and the connecting portion (34). The connecting portion (34) is pressed against the circuit board (12) based on a restoring force of the resiliently deformed resilient portion (33).

5 Claims, 22 Drawing Sheets

BOARD CONNECTOR

CROSS REFERENCE TO RELATED APPLICATIONS

This application is a national phase of PCT application No. PCT/JP2022/013348, filed on 23 Mar. 2022, which claims priority from Japanese patent application No. 2021-085922, filed on 21 May 2021, all of which are incorporated herein by reference.

TECHNICAL FIELD

The present disclosure relates to a board connector.

BACKGROUND

A connector disclosed in Patent Document 1 is provided with a plurality of electrically conductive contacts and an insulator for holding the electrically conductive contacts. The electrically conductive contact includes a terminal portion extending toward a board. The electrically conductive contact is electrically and mechanically connected to the board by being press-fit into a through hole of the board.

PRIOR ART DOCUMENT

Patent Document

Patent Document 1: JP 2000-113928 A

SUMMARY OF THE INVENTION

Problems to be Solved

In a configuration in which terminal fittings are mounted on a circuit board by press-fitting as in a connector of Patent Document 1 and a configuration in which terminal fittings are mounted on a circuit board by soldering or the like, it is difficult to remove the terminal fittings from the circuit board in the repair or the like of the connector.

A connector of the present disclosure was completed on the basis of the above situation and a terminal fitting can be easily removed from a circuit board.

Means to Solve the Problem

The present disclosure is directed to a board connector to be fixed to a circuit board, the board connector being provided with a terminal fitting and a housing, the terminal fitting being mounted in the housing, the terminal fitting including a support receiving portion to be supported by the housing, a connecting portion to be connected to the circuit board and a resiliently deformable resilient portion provided between the support receiving portion and the connecting portion, and the connecting portion being pressed against the circuit board based on a restoring force of the resiliently deformed resilient portion.

Effect of the Invention

According to the present disclosure, a terminal fitting can be easily removed from a circuit board.

DETAILED DESCRIPTION TO EXECUTE THE INVENTION

Description of Embodiments of Present Disclosure

Figure 1:
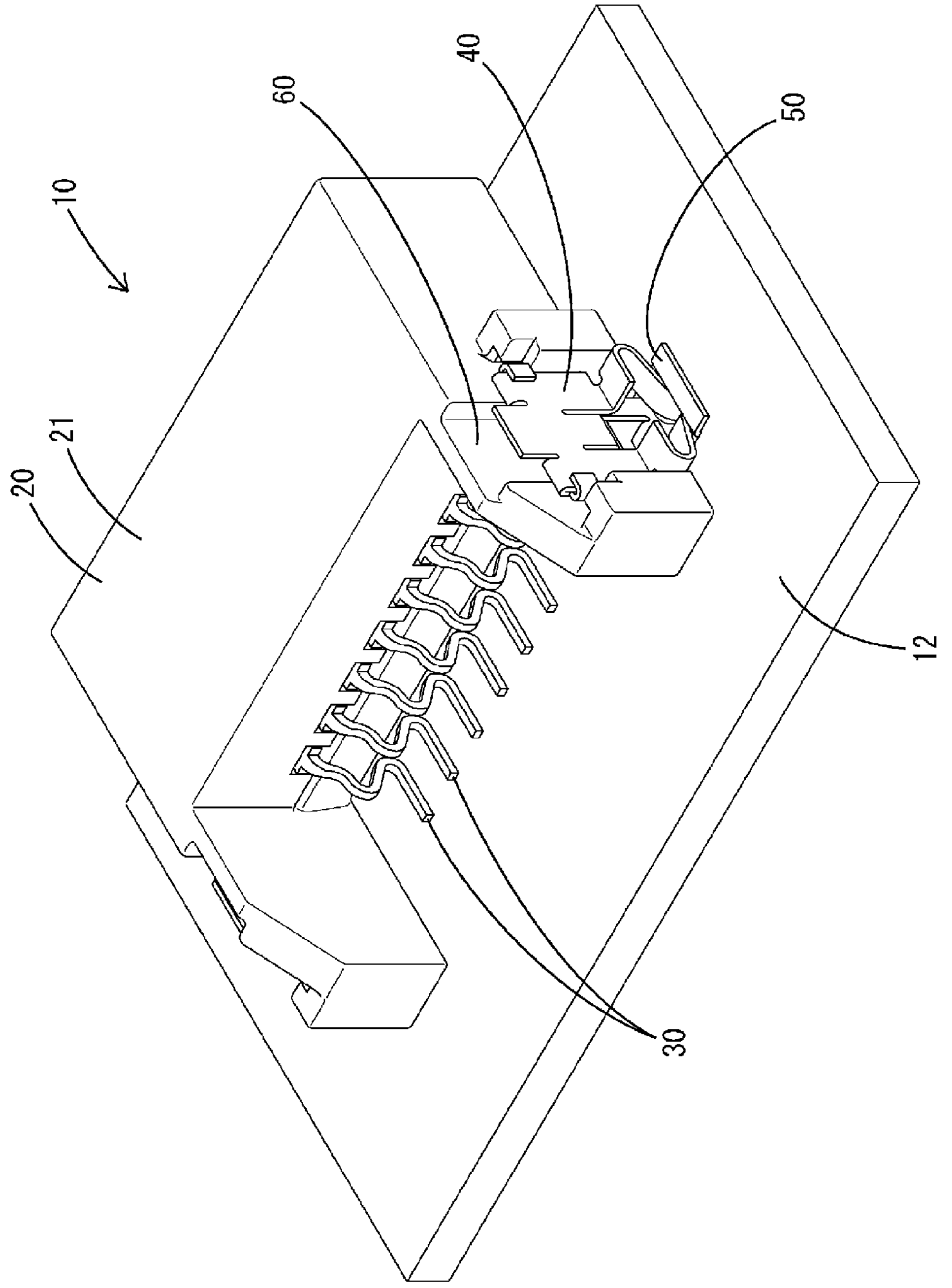
FIG. 1 is a perspective view showing a state where a board connector of a first embodiment is fixed to a circuit board.

First, embodiments of the present disclosure are listed and described.

(1) The board connector of the present disclosure is to be fixed to a circuit board and provided with a terminal fitting and a housing, the terminal fitting being mounted in the housing, the terminal fitting including a support receiving portion to be supported by the housing, a connecting portion to be connected to the circuit board and a resiliently deformable resilient portion provided between the support receiving portion and the connecting portion, and the connecting portion being pressed against the circuit board based on a restoring force of the resiliently deformed resilient portion.

According to the configuration of the present disclosure, since the connecting portion of the terminal fitting is pressed against the circuit board and connected to the circuit board based on the restoring force of the resiliently deformed resilient portion, the connecting portion can be easily removed from the circuit board as compared to connection by press-fitting, soldering or the like.

(2) Preferably, the board connector is provided with a fixing member to be mounted on the housing directly or via another member, the fixing member being fixed to the circuit board, the fixing member fixing the housing to the circuit board, the fixing member includes a mounting portion to be mounted on the housing directly or via the other member and a fixing portion to be inserted into and fixed in a hole provided in the circuit board, the fixing portion includes a pair of hooking pieces resiliently deformable by being inserted into the hole, and the pair of hooking pieces are fixed by being resiliently deformed in directions toward each other in an insertion process and being hooked to an edge part of the hole based on restoring forces.

According to this configuration, since the fixing member for fixing the housing to the circuit board is fixed to the housing using the restoring forces of the resilient deformation of the pair of hooking pieces, fixing by soldering or the like is not necessary. Thus, the board connector can be easily removed from the circuit board by resiliently deforming the pair of hooking pieces and removing the fixing member from the hole.

(3) Preferably, the board connector is provided with a supporting member to be mounted on the housing, the supporting member supporting the fixing member, the supporting member includes a penetrating portion projecting toward a side opposite to the housing by being passed through the hole, a pressure receiving surface facing toward the circuit board is provided on a projecting end part of the penetrating portion, and the hooking pieces contact the circuit board and the pressure receiving surface of the penetrating portion based on restoring forces by resilient deformation of the hooking pieces.

According to this configuration, the supporting member can be pressed in a direction away from the circuit board (toward a side opposite to the housing) by the hooking pieces contacting the circuit board and the pressure receiving surface of the penetrating portion based on the restoring forces of the resilient deformation. Thus, the housing, on which the supporting member is mounted, is pressed against the circuit board, and the connecting portion of the terminal fitting is pressed against the circuit board.

(4) Preferably, a plurality of the terminal fittings are mounted side by side along an alignment direction in the housing, and the fixing member is provided at a position overlapping a plurality of the connecting portions in the alignment direction.

According to this configuration, contact pressures of the terminal fittings with the circuit board are easily ensured and the housing is less likely to be inclined with respect to the circuit board as compared to a configuration in which the fixing member is provided at a position deviating from the alignment direction.

Details of Embodiments of Present Disclosure

First Embodiment

A first specific embodiment of a board connector of the present disclosure is described with reference to FIGS. 1 to 13. In the first embodiment, upper and lower sides shown in FIGS. 1 and 3 to 13 are directly defined as upper and lower sides concerning a vertical direction. Right and left sides shown in FIGS. 1 to 4, 6 and 8 to 11 are respectively defined as front and rear sides concerning a front-rear direction. Back and front sides shown in FIGS. 1 to 3 and 8 to 13 are respectively defined as right and left sides concerning a lateral direction.

(Configuration of Connector)

Figure 2:
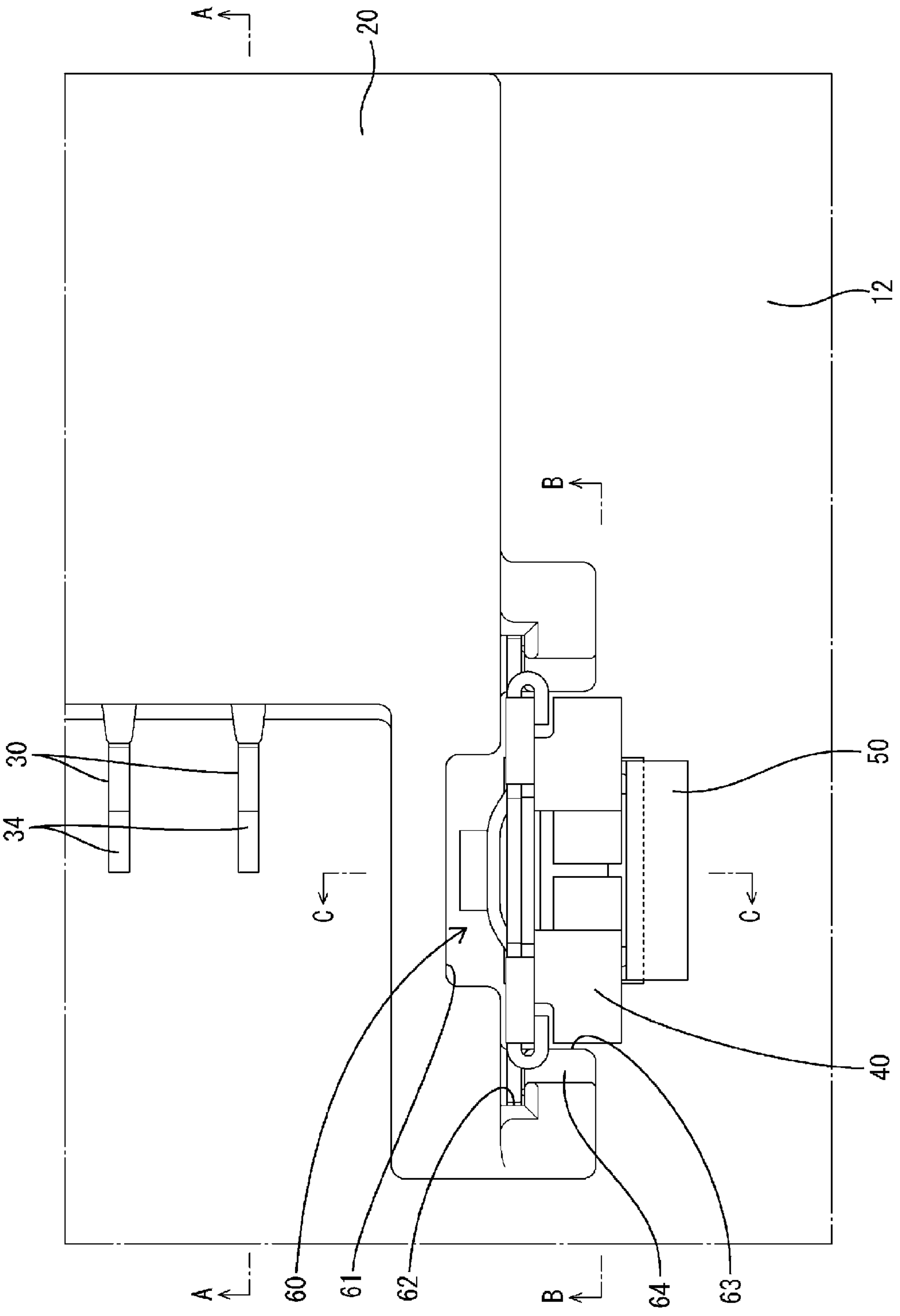
FIG. 2 is a plan view showing a part of the circuit board and a part of the board connector in FIG. 1.

A board connector 10 (hereinafter, also merely referred to as a connector 10) of the first embodiment is disposed on a plate surface (surface) of a circuit board 12 as shown in FIGS. 1 and 2. The connector 10 is provided with a housing 20, a plurality of terminal fittings 30, a pair of fixing members 40 and a pair of supporting members 50. The housing 20 is connectable to a mating housing (not shown).

The fixing members 40 and the supporting members 50 are respectively provided on both left and right sides of the housing 20. The supporting member 50 is mounted on the housing 20 and supports the fixing member 40. The fixing member 40 is mounted on the housing 20 via the supporting member 50, is fixed to the circuit board 12 and fixes the housing 20 to the circuit board 12.

(Configuration of Housing)

Figure 8:
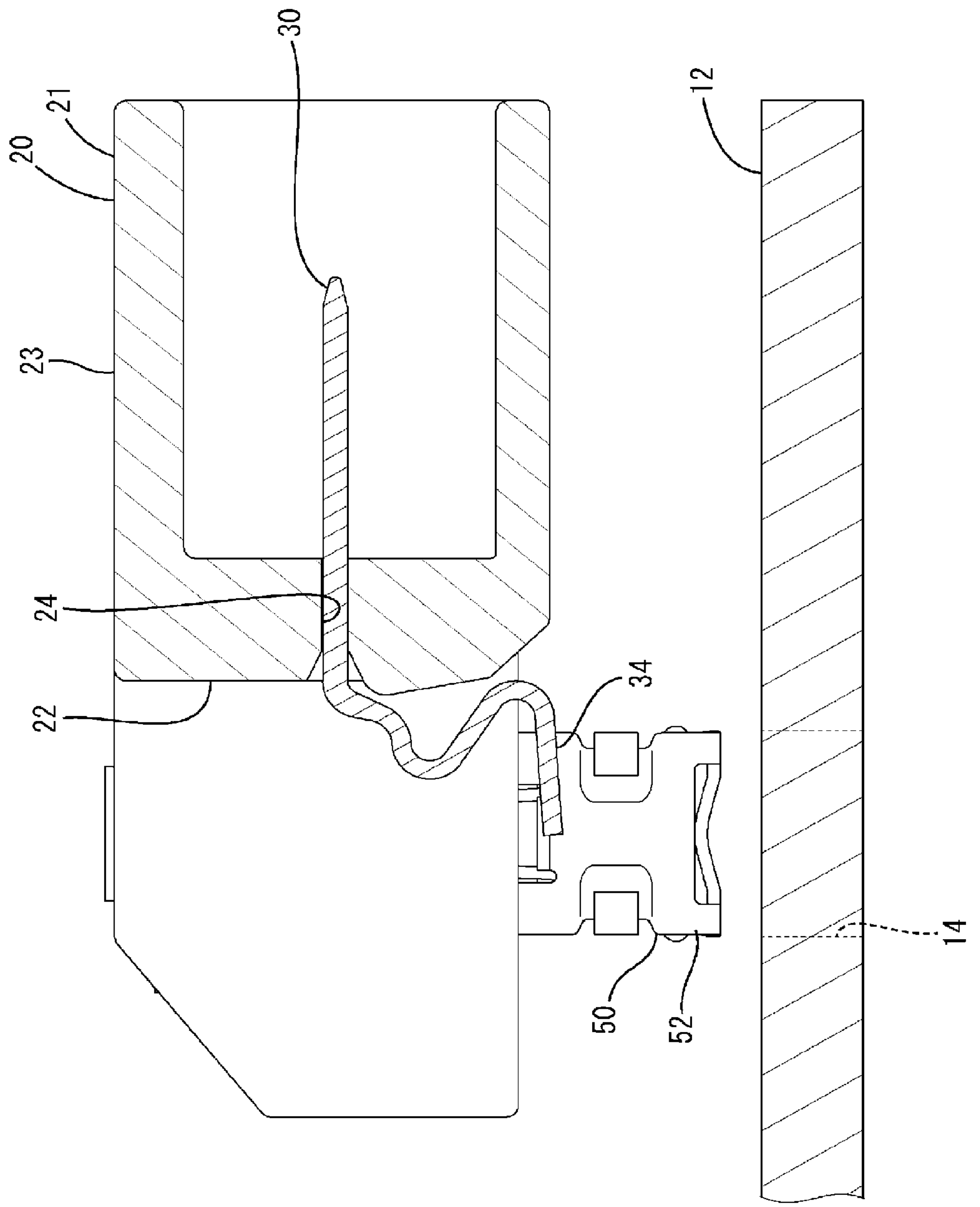
FIG. 8 is a view in section along A-A of FIG. 2 showing a state before the board connector is fixed to the circuit board.

The housing 20 is, for example, made of synthetic resin. As shown in FIGS. 1 and 8, the housing 20 includes a receptacle 21 in the form of a rectangular tube open forward. As shown in FIG. 8, the receptacle 21 includes a back wall 22 along the vertical direction and a fitting portion 23 projecting forward from the outer edge of the back wall 22. As shown in FIG. 8, a plurality of back wall holes 24 (only one is shown in FIG. 8) are provided to penetrate through the back wall 22 in the front-rear direction. The terminal fitting 30 is mounted by being press-fit into each back wall hole 24 of the back wall 22. The fitting portion 23 has a rectangular tube shape and is fittable to the mating housing (not shown).

Figure 10:
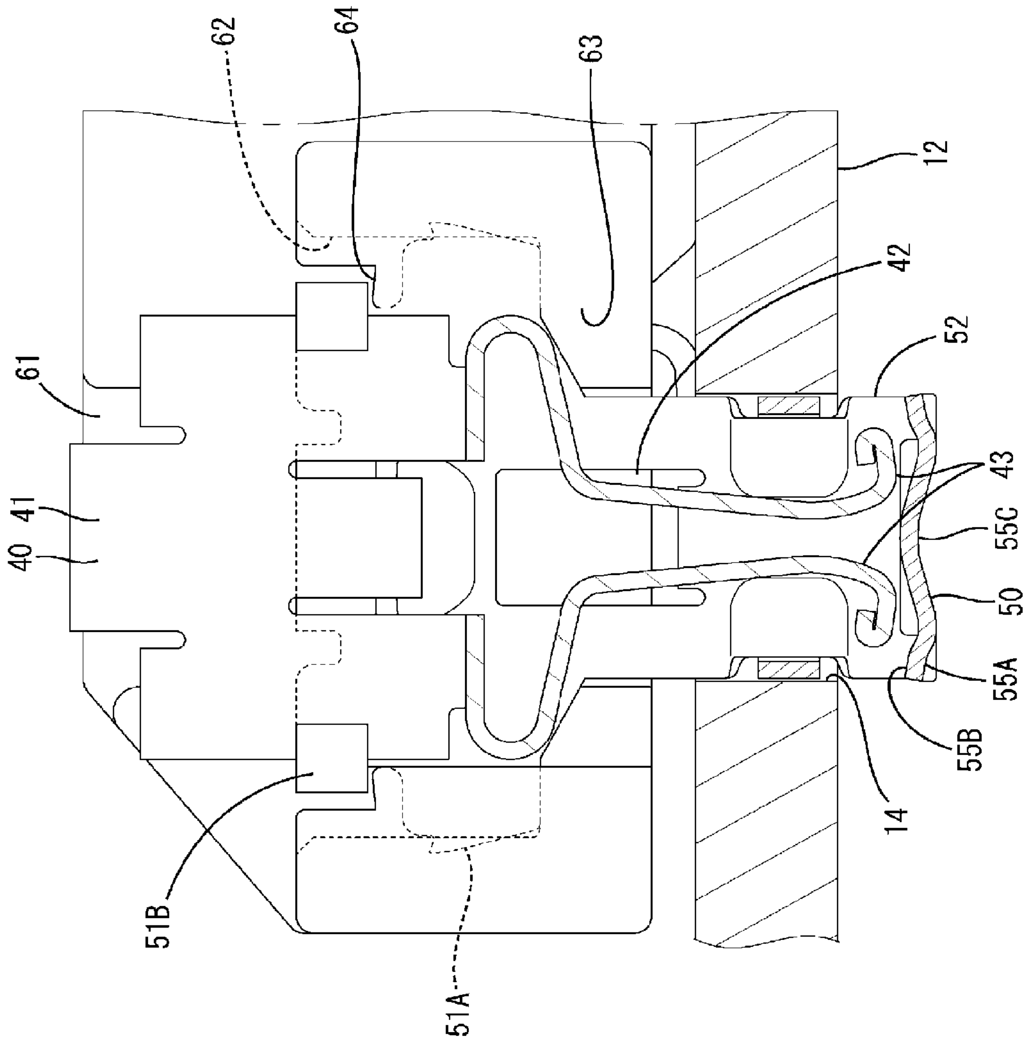
FIG. 10 is a view in section along B-B of FIG. 2 showing a state where the fixing member is at a temporary locking position.

As shown in FIGS. 1 and 2, fixing grooves 60, into which the supporting members 50 are mounted, are provided on both left and right sides of a rear end side of the receptacle 21. The fixing groove 60 is recessed inward in the lateral direction (toward the other fixing groove 60). The supporting member 50 is inserted into the fixing groove 60 from above. As shown in FIGS. 2 and 10, the fixing groove 60 includes a first groove 61, a second groove 62 and a third groove 63. The first groove 61, the second groove 62 and the third groove 63 of the fixing groove 60 are provided in this order from a laterally inner side (side of the other fixing groove 60) toward a laterally outer side. The first groove 61 is open in the vertical direction and recessed inward in the lateral direction (toward the other fixing groove 60). The second groove 62 has a larger width in the front-rear direction than the first groove 61. The second groove 62 is provided in a stepped manner on a laterally outer side of the first groove 61. The third groove 63 has a width in the front-rear direction larger than the first groove 61 and smaller than the second groove 62. The third groove 63 is provided in a stepped manner on a laterally outer side of the second groove 62. Recesses 64 recessed downward are respectively provided on the upper ends of front and rear wall portions of the third groove 63.

(Configuration of Terminal Fitting)

Figure 3:
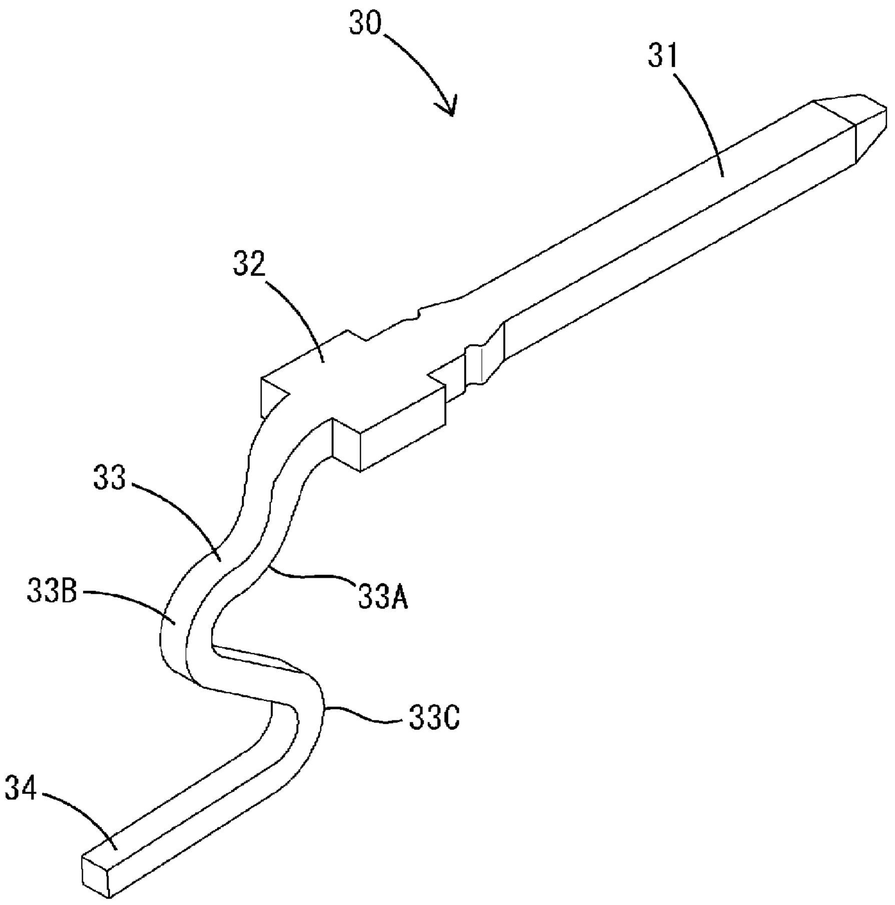
FIG. 3 is a perspective view of a terminal fitting.

For example, as shown in FIG. 3, the terminal fitting 30 is configured as a male terminal fitting. The terminal fitting 30 is made of electrically conductive metal and in the form of an elongated tab. The terminal fitting 30 is includes a tab portion 31, a support receiving portion 32, a resilient portion 33 and a connecting portion 34. The tab portion 31 extends in the front-rear direction. The tab portion 31 is connected to a mating terminal (female terminal fitting).

The support receiving portion 32 is connected to the rear end of the tab portion 31. The support receiving portion 32 is wider in the lateral direction than other parts of the terminal fitting 30. The support receiving portion 32 is press-fit into the back wall hole 24 of the housing 20 and supported in the housing 20.

The resilient portion 33 extends from the rear end of the support receiving portion 32. The resilient portion 33 is provided between the support receiving portion 32 and the connecting portion 34 and resiliently deformable. The resilient portion 33 includes a first bent portion 33A, a second bent portion 33B and a third bent portion 33C. The first bent portion 33A extends downward from the rear end of the support receiving portion 32. The first bent portion 33A is bent to be convex toward a front-lower side. The second bent portion 33B extends downward from the rear end of the first bent portion 33A. The second bent portion 33B is bent to be convex rearward. The third bent portion 33C extends to a front-lower side from the lower end of the second bent portion 33B. The third bent portion 33C is bent to be convex forward. The resilient portion 33 is, for example, resiliently deformable such that the first, second and third bent portions 33A, 33B and 33C are deflected inward.

The connecting portion 34 extends to a rear-lower side from the lower end of the resilient portion 33 (specifically, the third bent portion 33C). The connecting portion 34 is electrically connected to an electrically conductive portion (not shown) of the circuit board 12. The connecting portion 34 is pressed against the circuit board 12 based on a restoring force of the resiliently deformed resilient portion 33.

(Configuration of Supporting Member)

Figure 6:
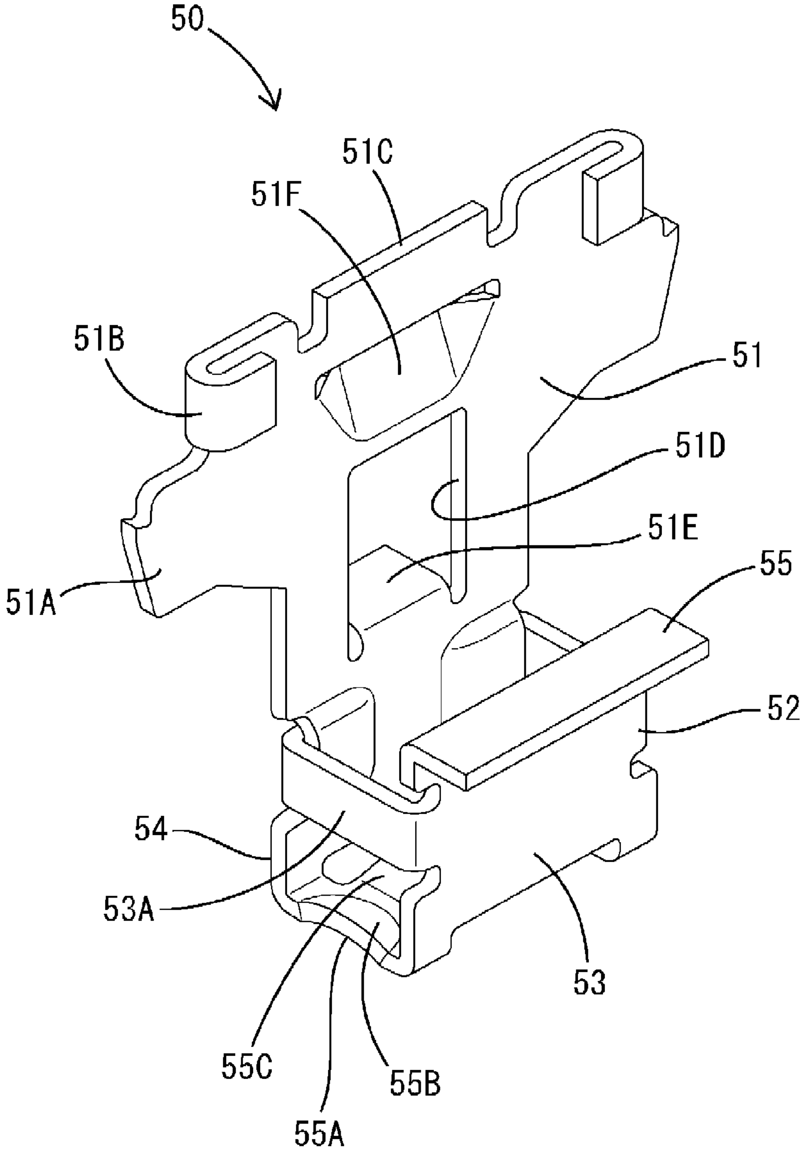
FIG. 6 is a perspective view of a supporting member when viewed from the laterally outer side.
Figure 7:
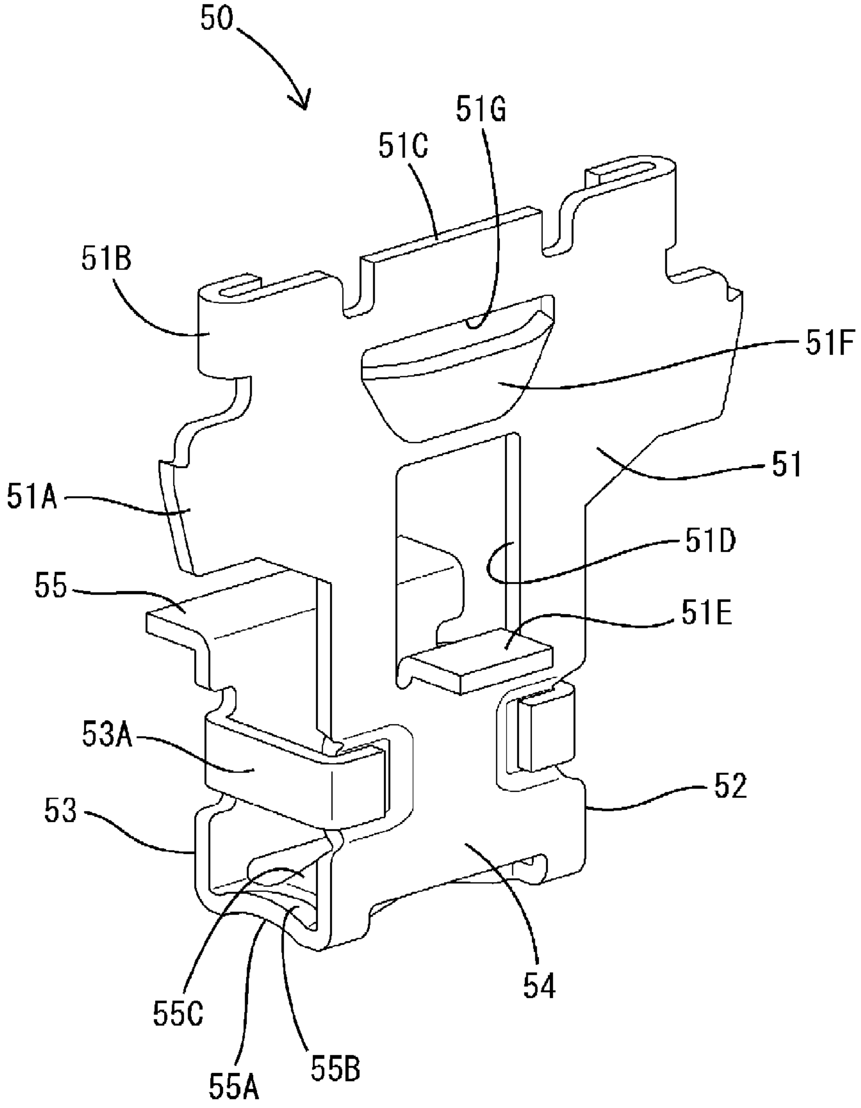
FIG. 7 is a perspective view of the supporting member when viewed from the laterally inner side.

As shown in FIGS. 6 and 7, the supporting member 50 is, for example, made of metal and integrally formed. The supporting member 50 includes an attaching portion 51 and a penetrating portion 52. The attaching portion 51 is a part to be attached to the housing 20. The attaching portion 51 is a constituent part of an upper end side of the supporting member 50. The attaching portion 51 is formed into a plate-like shape. The attaching portion 51 is provided with hooking pieces 51A respectively projecting both forward and rearward from the vicinity of a vertically central part. The attaching portion 51 is provided with folded portions 51B extending both forward and rearward from upper sides of the hooking pieces 51A and bent to be folded. An upper edge portion 51C projecting upward is provided at a position between a pair of the folded portions 51B on the upper end of the attaching portion 51. A through hole 51D penetrating in the lateral direction is provided in a center of the attaching portion 51. The through hole 51D has a rectangular shape. A bent piece 51E bent laterally inward (toward a side opposite to a bent side of the folded portions 51B). In the attaching portion 51, a bulging portion 51F bulging laterally inward (toward the same side as a folded side of the bent piece 51E) is provided between the upper edge portion 51C and the through hole 51D. The bulging portion 51F is, for example, formed by being struck laterally inward after a cut extending in the lateral direction is formed.

The penetrating portion 52 is a constituent part on a lower end side of the supporting member 50. The penetrating portion 52 is in the form of a pocket recessed downward. The penetrating portion 52 is passed through a hole 14 of the circuit board 12 and projects toward a side opposite to the housing 20. The penetrating portion 52 includes a first plate 53 and a second plate 54. The first and second plates 53, 54 are facing each other in the lateral direction. Strip-like arm portions 53A are respectively provided on both front and rear ends of the first plate 53. The arm portions 53A extend around to an opposite surface of the second plate 54 (surface opposite to the first plate 53) and support the second plate 54. Both front and rear ends of the lower edge of the first plate 53 and those of the lower edge of the second plate 54 are respectively coupled by pressure receiving portions 55A. The pressure receiving portions 55A are provided on a projecting end part of the penetrating portion 52. The upper surface of the pressure receiving portion 55A serves as a pressure receiving surface 55B facing a lower surface side of the circuit board 12 with the supporting member 50 attached to the circuit board 12. A bridge portion 55C is provided to bridge a pair of the pressure receiving portions 55A. A bent portion 55 bent laterally outward (toward a side opposite to the second plate 54) is provided on the upper end of the first plate 53.

The supporting member 50 is, for example, inserted into the fixing groove 60 from above. As shown in FIGS. 2 and 10, the supporting member 50 is fixed in the fixing groove 60. The hooking pieces 51A are press-fit into the second groove 62. The folded portions 51B are disposed in the recesses 64. The folded portions 51B can contact the bottom surfaces (lower surfaces) of the recesses 64. The bent piece 51E and the bulging portion 51F are disposed in the first groove 61. The pressure receiving surfaces 55B are facing upward (toward the circuit board 12 in a state attached to the circuit board 12).

(Configuration of Fixing Member)

Figure 4:
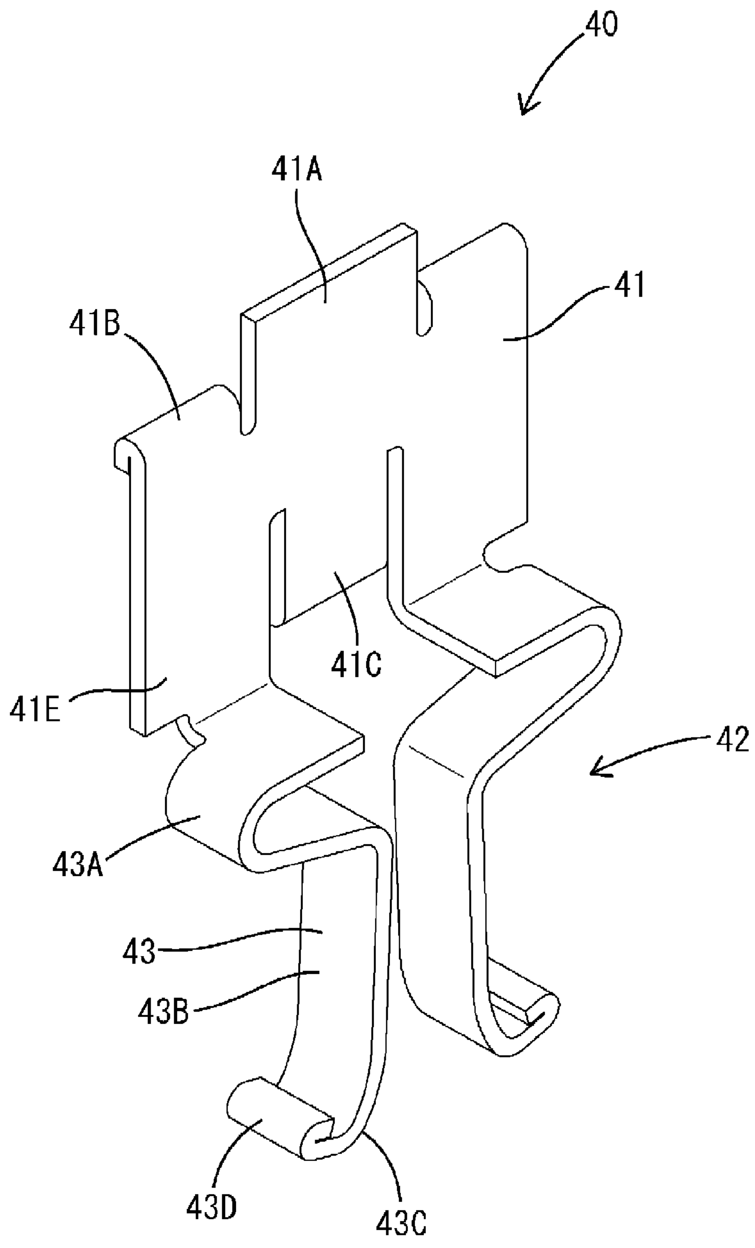
FIG. 4 is a perspective view of a fixing member when viewed from a laterally outer side.
Figure 5:
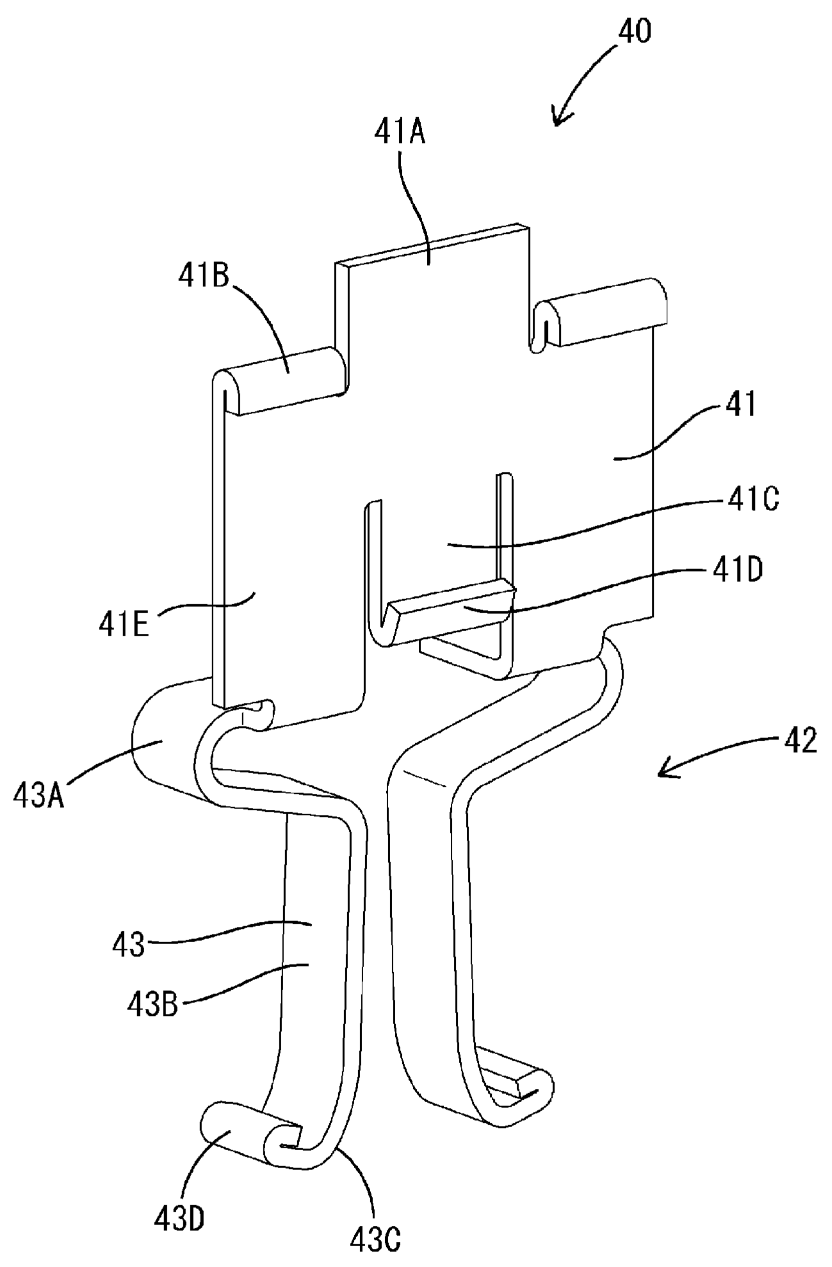
FIG. 5 is a perspective view of the fixing member when viewed from a laterally inner side.

As shown in FIGS. 4 and 5, the fixing member 40 is made of metal and integrally formed. The fixing member 40 includes a mounting portion 41 and a fixing portion 42. The mounting portion 41 is a part to be mounted on the housing 20 via the supporting member 50. The mounting portion 41 constitutes an upper end part of the fixing member 40. The mounting portion 41 is formed into a plate-like shape. A rectangular upper plate portion 41A projecting upward is provided in a center in the front-rear direction on the upper edge of the mounting portion 41. First folded pieces 41B are respectively provided on both front and rear sides of the upper plate portion 41A in the mounting portion 41. The first folded pieces 41B extend upward and are bent to be folded laterally inward (toward the other fixing member 40 in a state mounted on the housing 20). A rectangular lower plate portion 41C projecting downward is provided in a center in the front-rear direction on the lower edge of the mounting portion 41. A second folded piece 41D bent to be folded laterally inward (toward the same side as a folded side of the first folded pieces 41B) is provided on the lower end of the lower plate portion 41C. Strip-like side plate portions 41E projecting downward are respectively provided on both front and rear sides of the lower plate portion 41C on the lower edge of the mounting portion 41.

The fixing portion 42 is inserted into and fixed in the hole 14 provided in the circuit board 12. The fixing portion 42 includes a pair of hooking pieces 43. The hooking piece 43 is resiliently deformable. The hooking piece 43 is inserted into the hole 14 of the circuit board 12. The hooking piece 43 includes a base end portion 43A, a deforming portion 43B and a hooking portion 43C. The base end portion 43A is bent to extend laterally outward (toward a side opposite to the folded side of the first folded pieces 41B) from the lower end of the side plate portion 41E and be convex outward in the front-rear direction (toward a side opposite to the other hooking piece 43). The deforming portion 43B extends downward from the tip (lower end) of the base end portion 43A. The hooking portion 43C extends from the tip of the deforming portion 43B. The hooking portion 43C is curved outward in the front-rear direction (toward a side opposite to the other hooking piece 43) and convex downward. A third folded piece 43D folded upward is provided on the tip of the hooking piece 43C.

Figure 12:
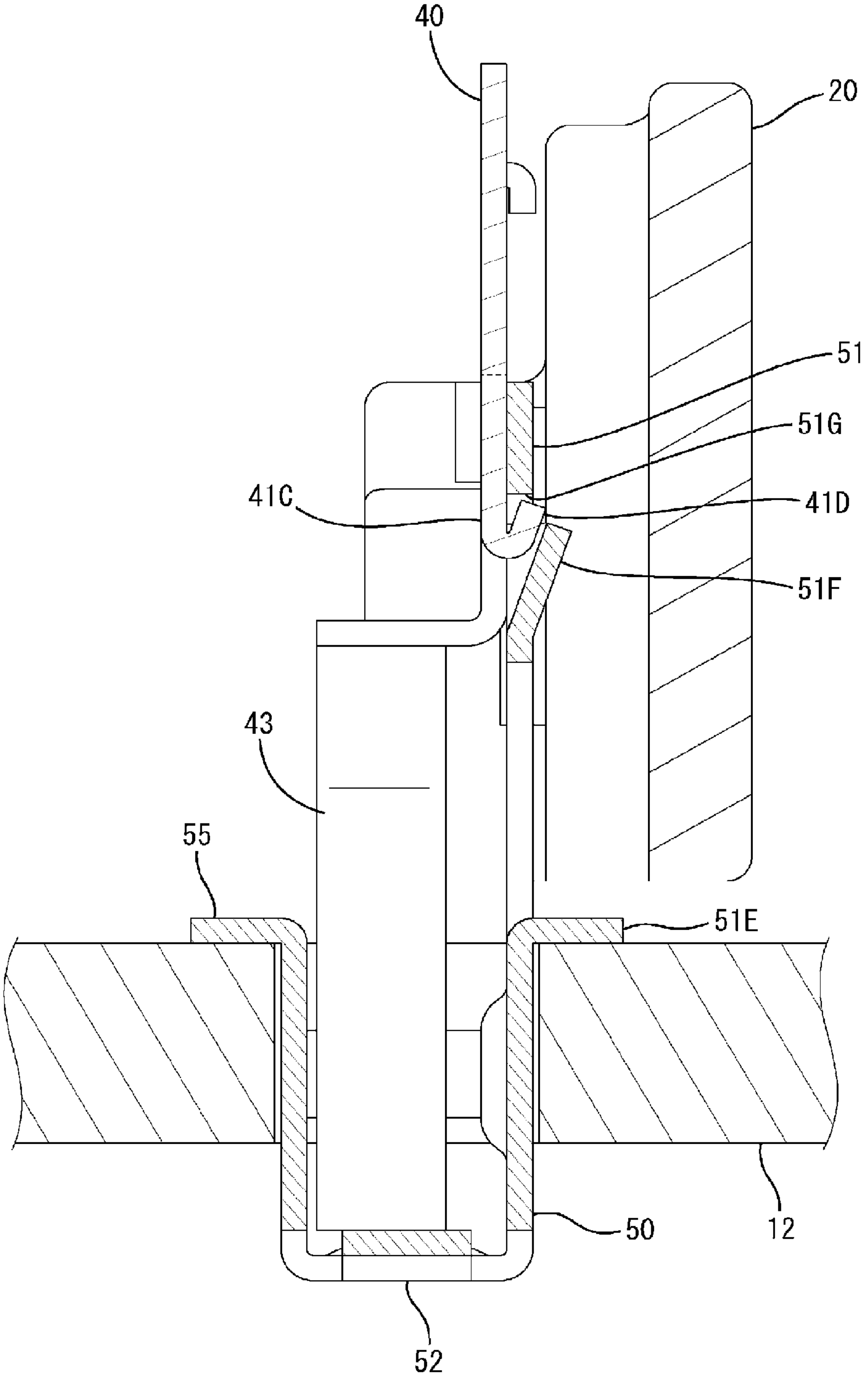
FIG. 12 is a view in section along C-C of FIG. 2 showing the state where the fixing member is at the temporary locking position.

As shown in FIGS. 2, 10, 12 and the like, the fixing member 40 is attached to the fixing member 50. Both left and right edge parts of the mounting portion 41 are sandwiched in the lateral direction by a surface on a laterally outer side (folded side of the first folded portions 51B) of the attaching portion 51 and the folded portions 51B. In this way, the fixing member 40 is movable in the vertical direction with respect to the supporting member 50. The fixing portion 42 (specifically, the pair of hooking pieces 43) is disposed in the penetrating portion 52. The fixing member 40 is displaced between a temporary locking position and a complete locking position with respect to the supporting member 50. The fixing member 40 shown in FIGS. 10 and 12 is located at the temporary locking position. The second folded piece 41D enters the inside of the bulging portion 51F as shown in FIG. 12. The second folded piece 41D is restricted from moving upward by interfering with an upper edge portion 51G of the bulging portion 51F (upper edge part of the cut formed when the bulging portion 51F is formed).

Figure 11:
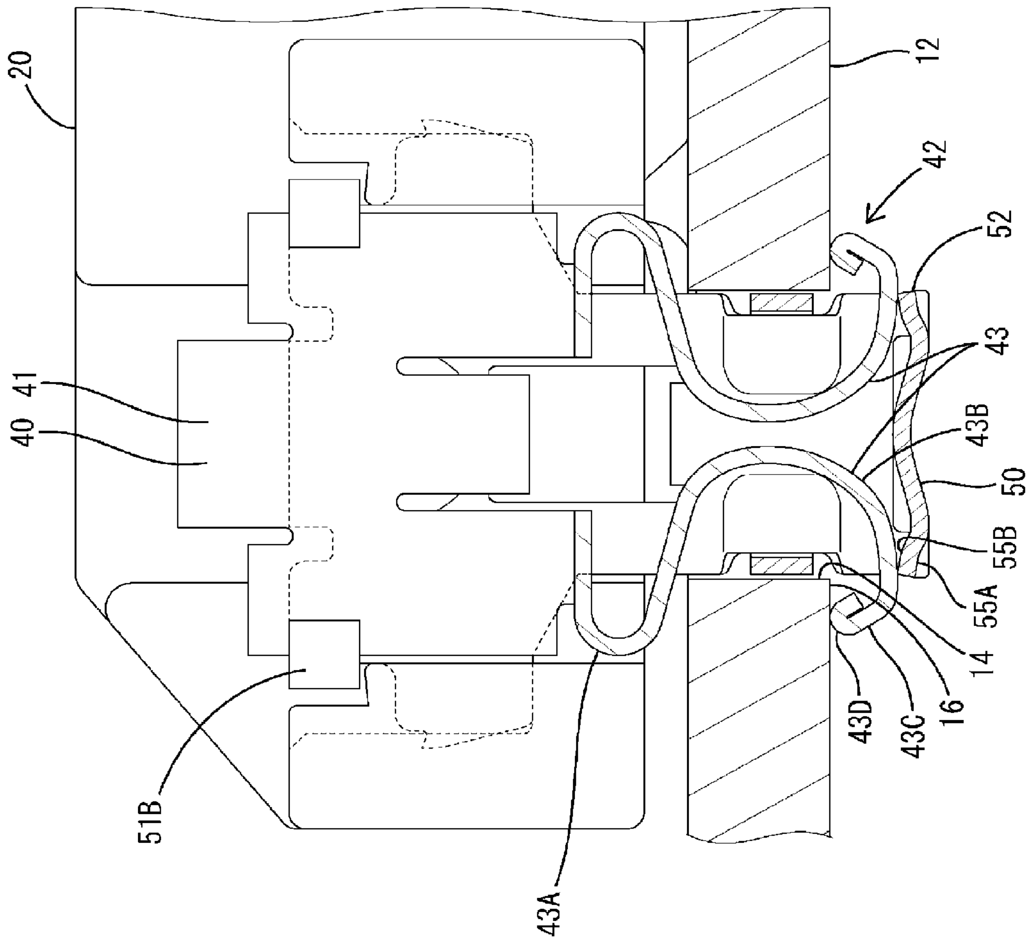
FIG. 11 is a view in section along B-B of FIG. 2 showing a state where the fixing member is at a complete locking position.
Figure 13:
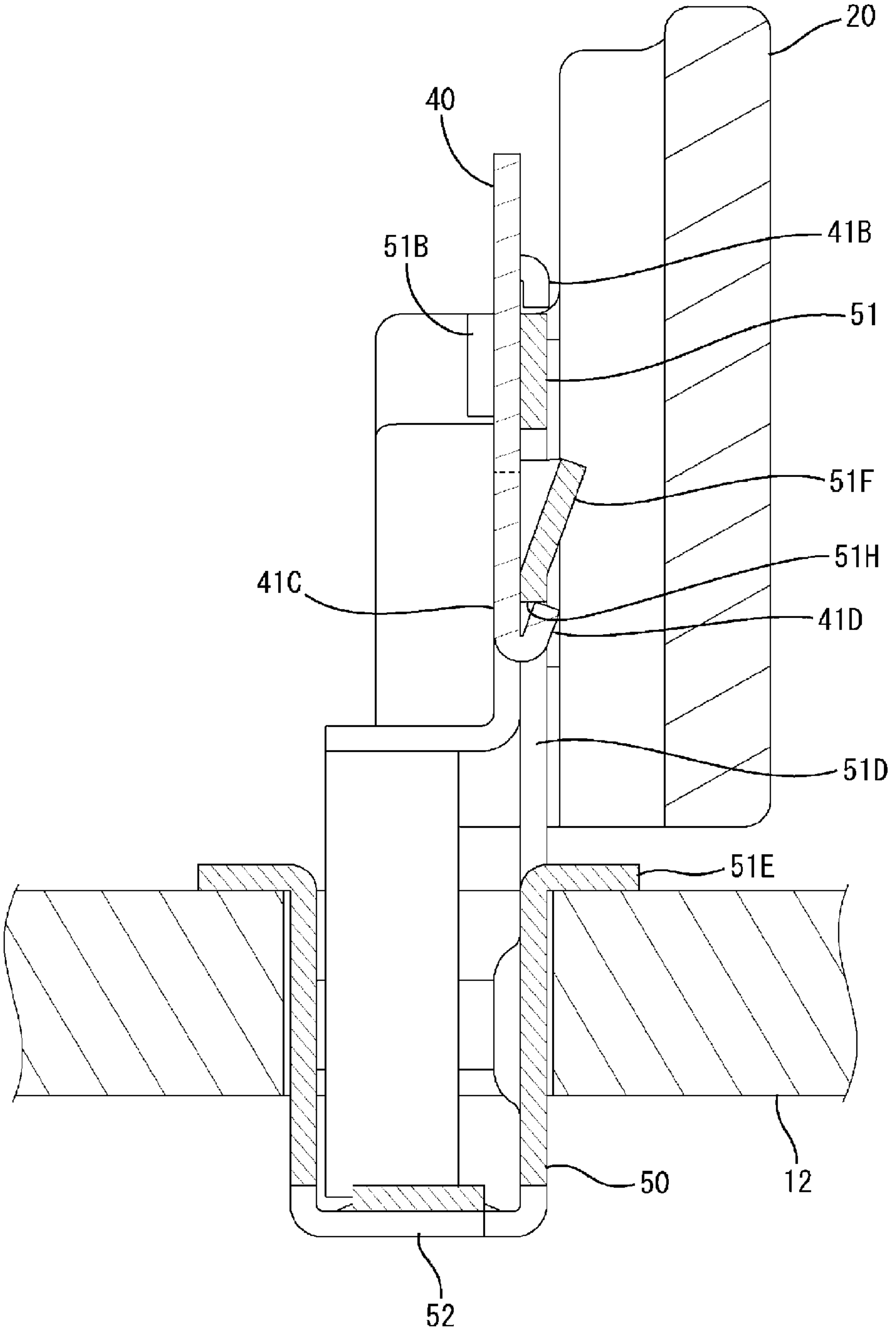
FIG. 13 is a view in section along C-C of FIG. 2 showing the state where the fixing member is at the complete locking position.

The fixing member 40 is displaced to the complete locking position by being pushed downward from the temporary locking position. For example, by pushing the upper plate portion 41A downward, the fixing member 40 is displaced from the temporary locking position to the complete locking position. The fixing member 40 shown in FIGS. 11 and 13 is located at the complete locking position. The lower plate portion 41C of the fixing member 40 is deflected laterally outward (direction opposite to a bulging direction of the bulging portion 51F) from the bulging portion 51F via the second folded piece 41D. As shown in FIG. 13, the second folded piece 41D rides over the bulging portion 51F and is hooked to an upper edge 51H of the through hole 51D from below. The first folded pieces 41B of the fixing member 40 are contactably facing the upper edge of the fixing member 50 including the folded portions 51B from above. In the above way, the fixing member 40 is fixed to the housing 20 via the supporting member 50.

(Fixing of Board Connector to Circuit Board)

First, the board connector 10 is prepared. Specifically, the terminal fittings 30, the supporting members 50 and the fixing members 40 are mounted in or on the housing 20. At this time, the fixing members 40 are located at the temporary locking position (see FIGS. 10 and 12). As shown in FIG. 8, the terminal fitting 30 is in a free state and the connecting portion 34 projects further downward than the housing 20. The penetrating portion 52 of the supporting member 50 projects further downward than the housing 20.

Figure 9:
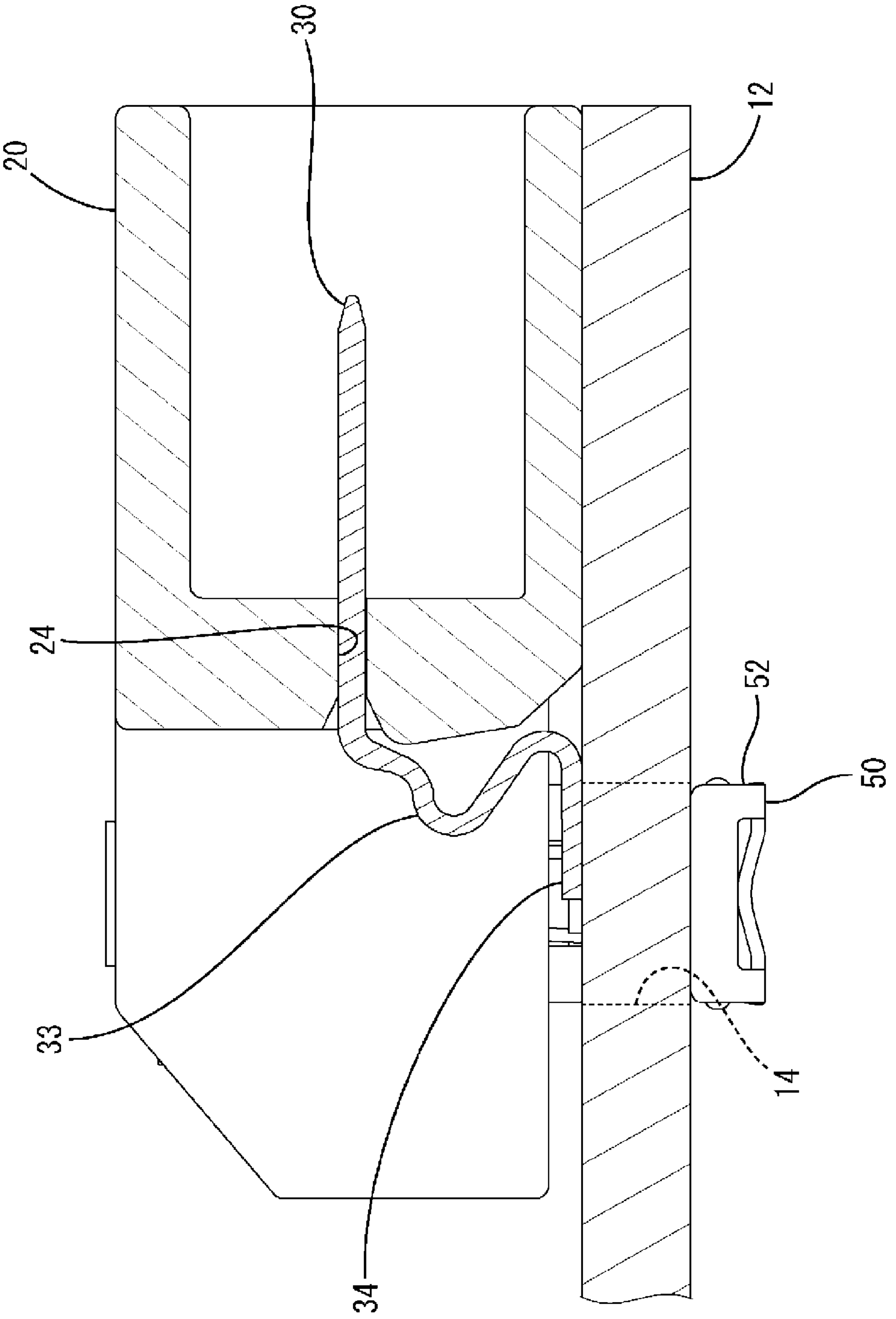
FIG. 9 is a view in section along A-A of FIG. 2 showing a state where the board connector is fixed to the circuit board.

Subsequently, as shown in FIG. 9, the board connector 10 is placed on the upper surface of the circuit board 12. The penetrating portion 52 of the supporting member 50 is passed through the hole 14. The penetrating portion 52 projects further downward than the lower surface of the circuit board 12. The pressure receiving surfaces 55B of the penetrating portion 52 face the lower surface of the circuit board 12. The bent piece 51E and the bent portion 55 of the supporting member 50 are in contact with the upper surface of the circuit board 12. In this way, the supporting member 50 is positioned with respect to the circuit board 12. As shown in FIGS. 10 and 12, the fixing member 40 is at the temporary locking position. The pair of hooking pieces 43 are in a free state.

Subsequently, the fixing member 40 is displaced from the temporary locking position to the complete locking position. The hooking portions 43C of the hooking pieces 43 contact the pressure receiving surfaces 55B. The pair of hooking pieces 43 are resiliently deformed in directions toward each other in an insertion process into the hole 14. The tips (third folded pieces 43D and base end parts thereof) of the hooking pieces 43 enter between the lower surface of the circuit board 12 (edge part 16 of the hole 14) and the pressure receiving portions 55A. The pair of hooking pieces 43 (hooking portions 43C) are fixed by being hooked to the lower edge part 16 of the hole 14 based on restoring forces. Specifically, the hooking piece 43 contacts the lower surface of the circuit board 12 (lower edge part 16 of the hole 14) and the pressure receiving surface 55B of the penetrating portion 52 based on the restoring force by the resilient deformation of the hooking piece 43. That is, the hooking piece 43 is stretched between the lower surface of the circuit board 12 (lower edge part 16 of the hole 14) and the pressure receiving surface 55B of the penetrating portion 52. By the contact of the hooking pieces 43 with the lower surface of the circuit board 12 and the pressure receiving surfaces 55B of the penetrating portion 52 in this way, the supporting member 50 can be pressed in a direction away from the circuit board 12 (toward the side opposite to the housing 20). Thus, the housing 20, on which the supporting member 50 is mounted, is pressed against the circuit board 12 and the connecting portions 34 of the terminal fittings 30 are pressed against the circuit board 12.

The connecting portions 34 of the terminal fittings 30 are pressed against the circuit board 12 based on restoring forces of the resiliently deformed resilient portions 33. Thus, by releasing a fixed state by the fixing members 40, the connecting portions 34 can be easily removed from the circuit board 12. In this way, the board connector 10 can be easily repaired. When the terminal fittings 30 are pressed against the circuit board 12, the resilient portions 33 are deflected, whereby the connecting portions 34 can wipe the circuit board 12. Since soldering or press-fitting is not used in connecting the terminal fittings 30 to the circuit board 12, damage on the circuit board 12 can also be reduced. Further, although the plurality of terminal fittings 30 are provided in alignment in the board connector 10, the lift of the predetermined connecting portion(s) 34 from the circuit board 12 can be suppressed since the connecting portions 34 are pressed against the circuit board 12 based on the restoring forces of the resilient portions 33 in the respective terminal fittings 30.

The pair of hooking pieces 43 are resiliently deformed in the directions toward each other in the insertion process and fixed by being hooked to the edge part 16 of the hole 14 based on the restoring forces. Since the fixing member 40 is fixed to the housing 20 using the restoring forces of the resilient deformation of the pair of hooking pieces 43 as just described, fixing by soldering or the like is not necessary. Thus, the connector 10 can be easily removed from the circuit board 12 by resiliently deforming the pairs of hooking pieces 43 and removing the fixing members 40 from the holes 14.

As shown in FIGS. 1 and 2, the plurality of terminal fittings 30 are mounted side by side in an alignment direction (lateral direction) in the housing 20. The pair of fixing members 40 are provided at positions overlapping the plurality of connecting portions 34 in the alignment direction (lateral direction) of the plurality of terminal fittings 30. That is, the pair of fixing members 40 are located on extensions of an alignment axis (straight line passing through the plurality of connecting portions 34 and parallel to the lateral direction) of the plurality of connecting portions 34. The pair of fixing members 40 are at the positions mainly overlapping the resilient portions 33 and the connecting portions 34 of the plurality of terminal fittings 30 in the alignment direction (lateral direction). In this way, contact pressures of the terminal fittings 30 with the circuit board 12 are easily ensured and the housing 20 is less likely to be inclined with respect to the circuit board 12 as compared to a configuration in which the fixing members 40 are provided at positions deviating from the alignment direction of the plurality of terminal fittings 30.

Effects of Embodiment

As described above, since the connecting portions 34 of the terminal fittings 30 are pressed against the circuit board 12 and connected to the circuit board 12 based on the restoring forces of the resiliently deformed resilient portions 33 according to the board connector 10 of the present disclosure, the terminal fittings 30 can be easily removed from the circuit board 12 as compared to connection by press-fitting, soldering or the like.

According to the board connector 10 of the present disclosure, the pair of hooking pieces 43 are resiliently deformed in the directions toward each other in the insertion process and fixed by being hooked to the edge part 16 of the hole 14 based on the restoring forces. In this way, the fixing member 40 for fixing the housing 20 to the circuit board 12 is fixed to the housing 20 using the restoring forces of the resilient deformation of the pair of hooking pieces 43, wherefore fixing by soldering or the like is not necessary. Thus, the board connector 10 can be easily removed from the circuit board 12 by resiliently deforming the pairs of hooking pieces 43 and removing the fixing members 40 from the holes 14.

According to the board connector 10 of the present disclosure, the hooking piece 43 contacts the circuit board 12 and the pressure receiving surface 55B of the penetrating portion 52 based on the restoring force by the resilient deformation of the hooking piece 43. In this way, the supporting member 50 can be pressed in the direction away from the circuit board 12 (toward the side opposite to the housing 20) by the hooking pieces 43 contacting the circuit board 12 and the pressure receiving surfaces 55B of the penetrating portion 52 based on the restoring forces of the resilient deformation. Thus, the housing 20, on which the supporting member 50 is mounted, is pressed against the circuit board 12 and the connecting portions 34 of the terminal fittings 30 are pressed against the circuit board 12.

According to the board connector 10 of the present disclosure, the fixing members 40 are provided at the positions overlapping the plurality of connecting portions 34 in the alignment direction of the plurality of terminal fittings 30. In this way, the contact pressures of the terminal fittings 30 with the circuit board 12 are easily ensured and the housing 20 is less likely to be inclined with respect to the circuit board 12 as compared to a configuration in which the fixing members 40 are provided at positions deviating from the alignment direction.

Second Embodiment

FIGS. 14 to 22 are drawings used to describe a board connector of a second embodiment. The supporting members are not provided in the second embodiment, which differs from the first embodiment in the configuration of fixing members. The other configuration is the same as in the first embodiment and not described in detail.

The second specific embodiment of the board connector of the present disclosure is described with reference to FIGS. 14 to 22. In the second embodiment, upper and lower sides shown in FIGS. 14 to 22 are directly defined as upper and lower sides concerning a vertical direction. Left and right sides shown in FIGS. 14, 19, 21 and 22 are respectively defined as front and rear sides concerning a front-rear direction. Left and right sides shown in FIGS. 15, 18 and 20 are directly defined as left and right sides concerning a lateral direction.

(Configuration of Connector)

Figure 14:
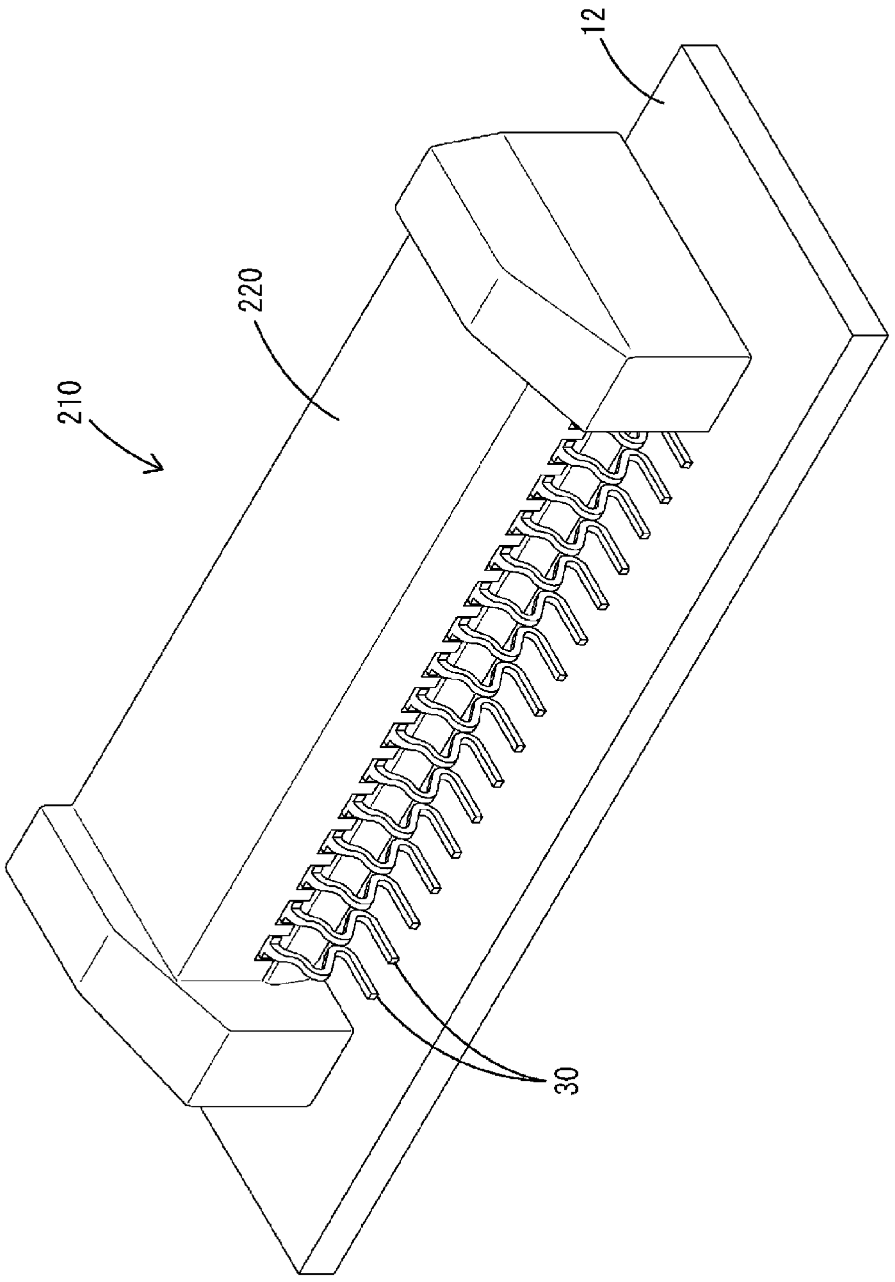
FIG. 14 is a perspective view from behind showing a state where a board connector of a second embodiment is fixed to a circuit board.
Figure 15:
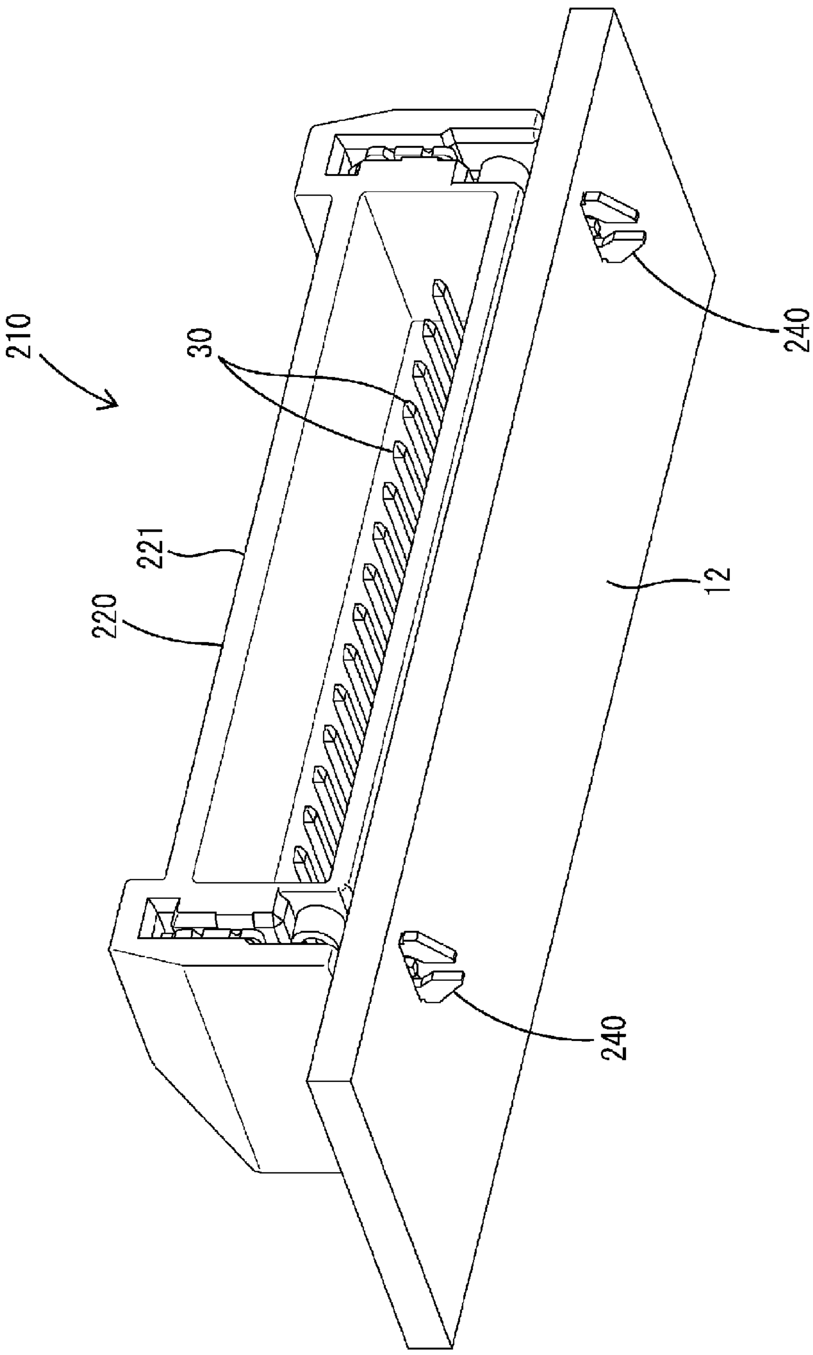
FIG. 15 is a perspective view from front showing the state where the board connector is fixed to the circuit board.

A board connector 210 (hereinafter, also merely referred to as a connector 210) of the second embodiment is disposed on a plate surface (surface) of a circuit board 12 as shown in FIGS. 14 and 15. The connector 210 is provided with a housing 220, terminal fittings 30 and fixing members 240. The housing 220 is connectable to a mating housing (not shown).

(Configuration of Housing)

Figure 21:
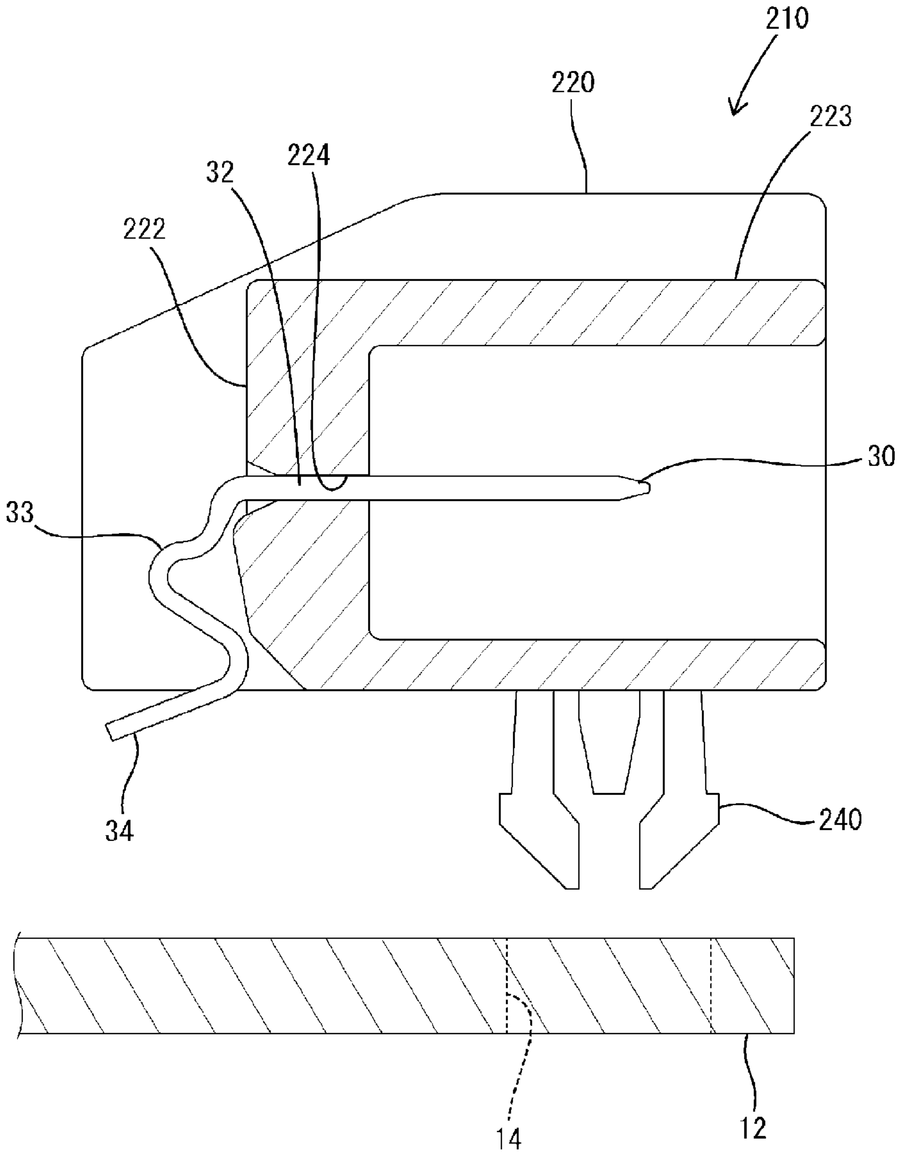
FIG. 21 is a side view in section showing a state before the board connector is fixed to the circuit board.

The housing 220 is, for example, made of synthetic resin. As shown in FIG. 15, the housing 220 includes a receptacle 221 in the form of a rectangular tube open forward. As shown in FIG. 21, the receptacle 221 includes a back wall 222 along the vertical direction and a fitting portion 223 projecting forward from the outer edge of the back wall 222. As shown in FIG. 21, a plurality of back wall holes 224 (only one is shown in FIG. 21) are provided to penetrate through the back wall 222 in the front-rear direction. The terminal fitting 30 is mounted by being press-fit into each back wall hole 224 of the back wall 22. The fitting portion 223 has a rectangular tube shape and is fittable to the mating housing (not shown).

Figure 18:
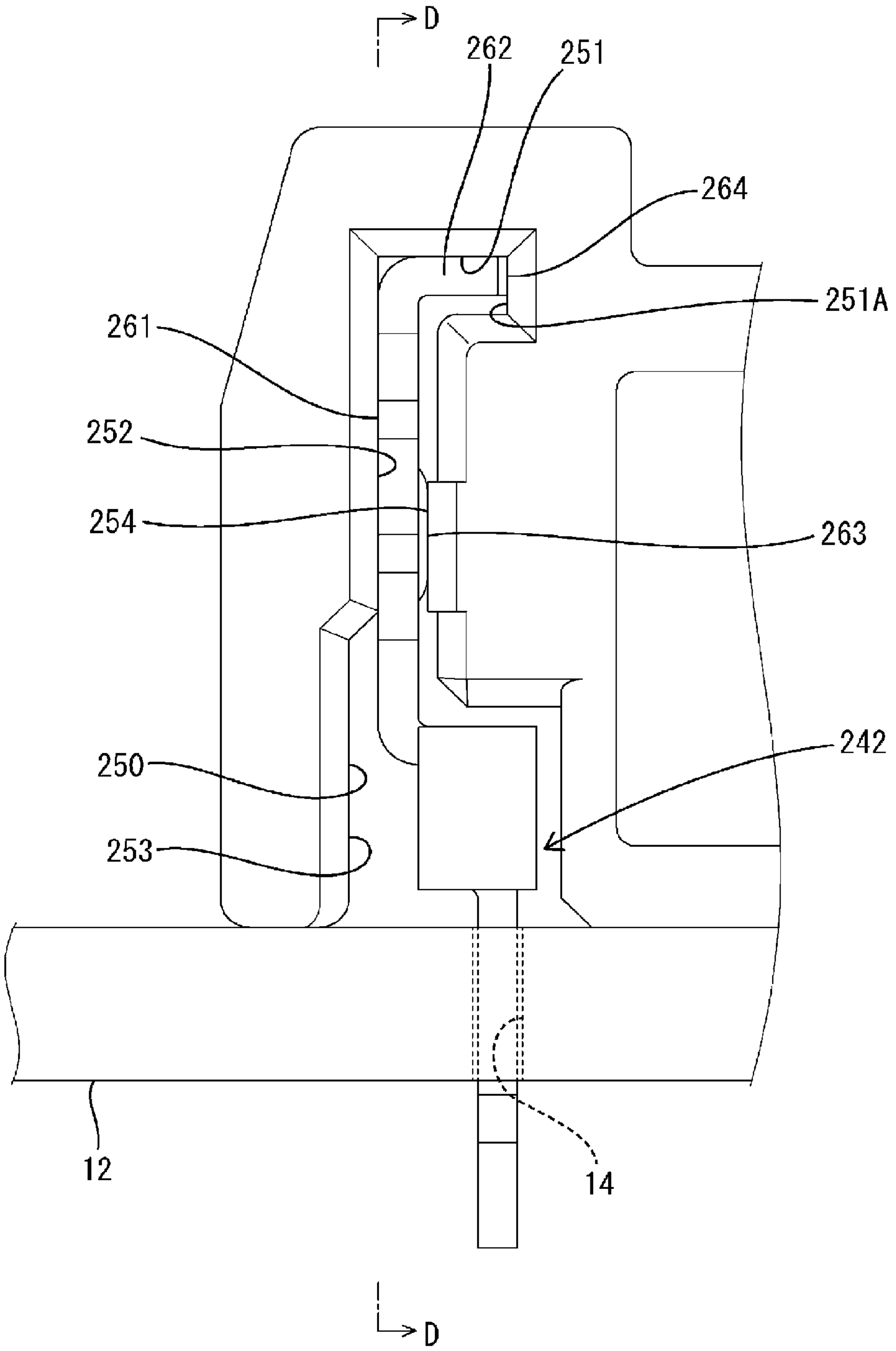
FIG. 18 is a side view of a part of the board connector and a part of the circuit board in FIG. 14 when viewed from front.
Figure 19:
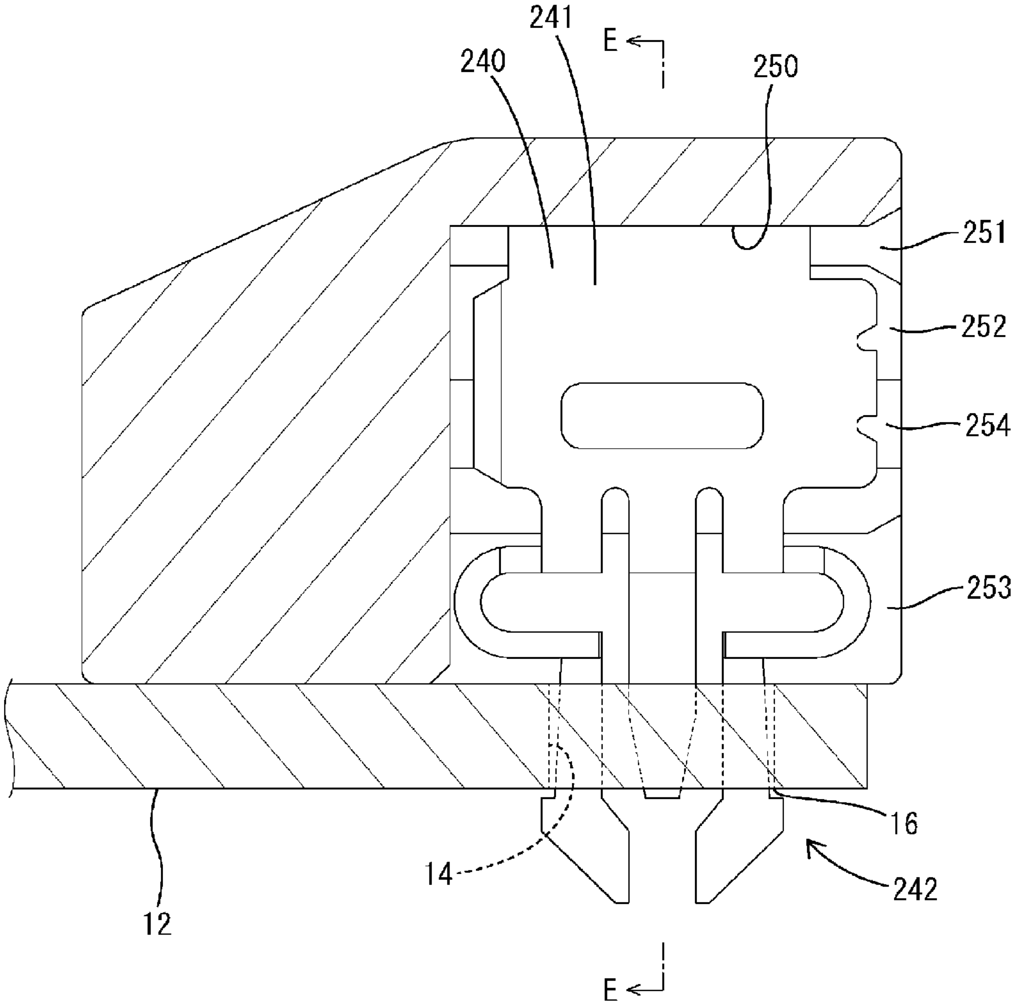
FIG. 19 is a section along D-D of FIG. 18.
Figure 20:
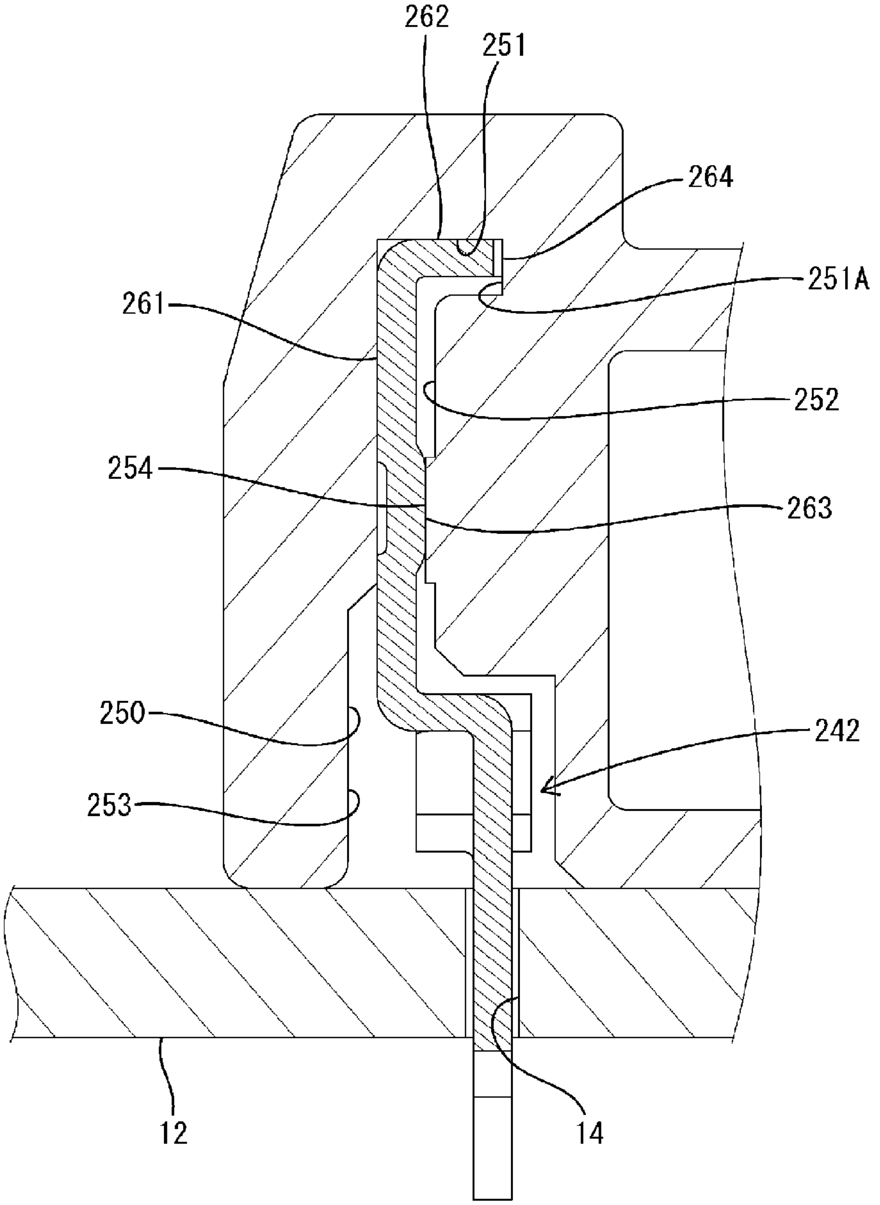
FIG. 20 is a section along E-E of FIG. 19.

As shown in FIGS. 18 to 20, fixing grooves 250, into which the fixing members 240 are mounted, are provided on both left and right sides of a rear end side of the receptacle 221. The fixing groove 250 is open forward and downward. The fixing member 240 is inserted into the fixing groove 250 from front. As shown in FIGS. 18 to 20, the fixing groove 250 includes an upper groove 251, a central groove 252 and a lower groove 253. The upper groove 251 constitutes an upper end part of the fixing groove 250. The upper groove 251 extends in the front-rear direction and is open forward. The upper groove 251 extends laterally inward (toward the other fixing groove 250) from the upper end of the central groove 252 and is wider in the lateral direction than the central groove 252. The central groove 252 constitutes a vertically central part of the fixing groove 250. The central groove 252 is long in the vertical direction and open forward. A housing-side protrusion 254 projecting laterally outward (toward a side opposite to the other fixing groove 250) is provided on the inner (side toward the other fixing groove 250) wall surface of the central groove 252. The lower groove 253 constitutes a lower end part of the fixing groove 250. The lower groove 253 is wider in the lateral direction than the upper groove 251 and the central groove 252.

(Configuration of Terminal Fitting)

The terminal fitting 30 is configured similarly to the terminal fitting 30 of the first embodiment. For example, as shown in FIG. 3, the terminal fitting 30 is configured as a male terminal fitting. A support receiving portion 32 is press-fit into the back wall hole 224 of the housing 220 and supported in the housing 220. A connecting portion 34 is pressed against the circuit board 12 based on a restoring force of a resiliently deformed resilient portion 33.

(Configuration of Fixing Member)

Figure 16:
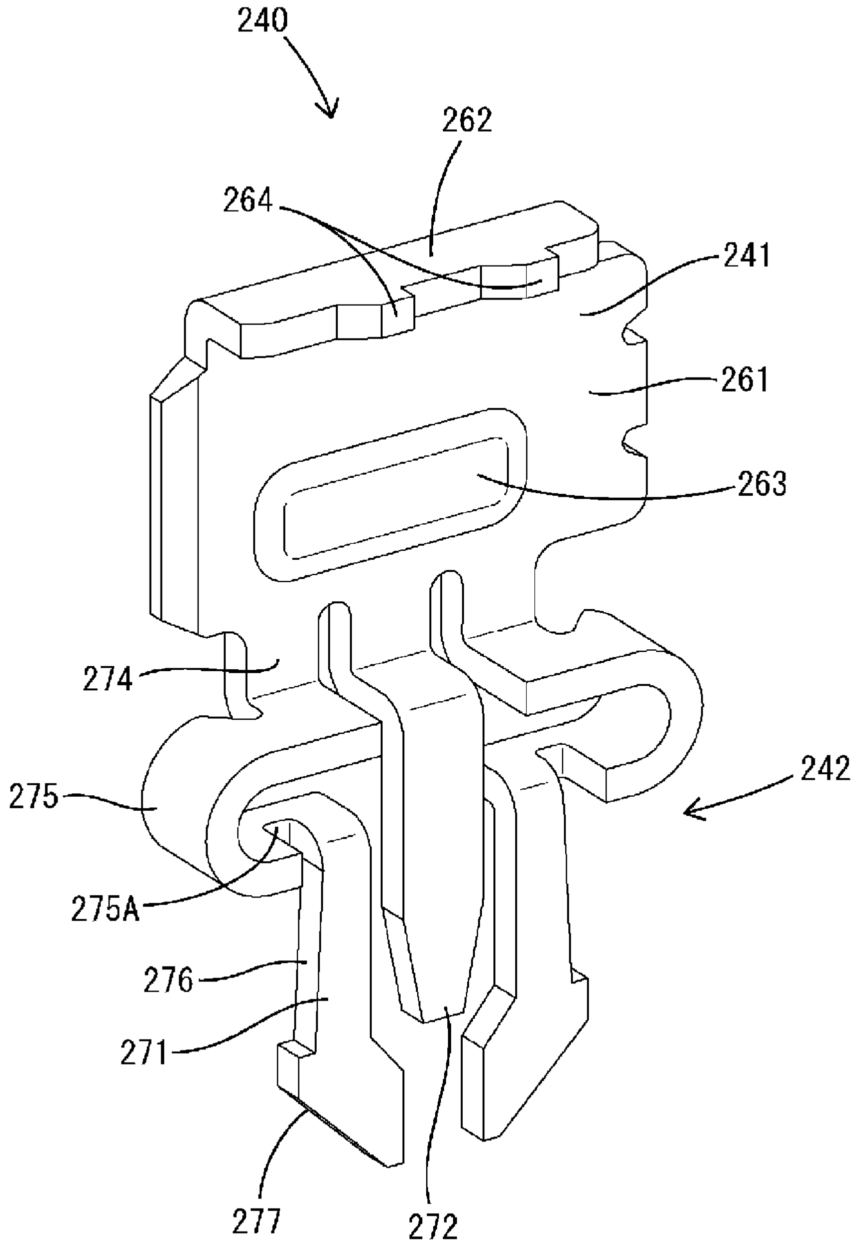
FIG. 16 is a perspective view of a fixing member when viewed from a laterally outer side.
Figure 17:
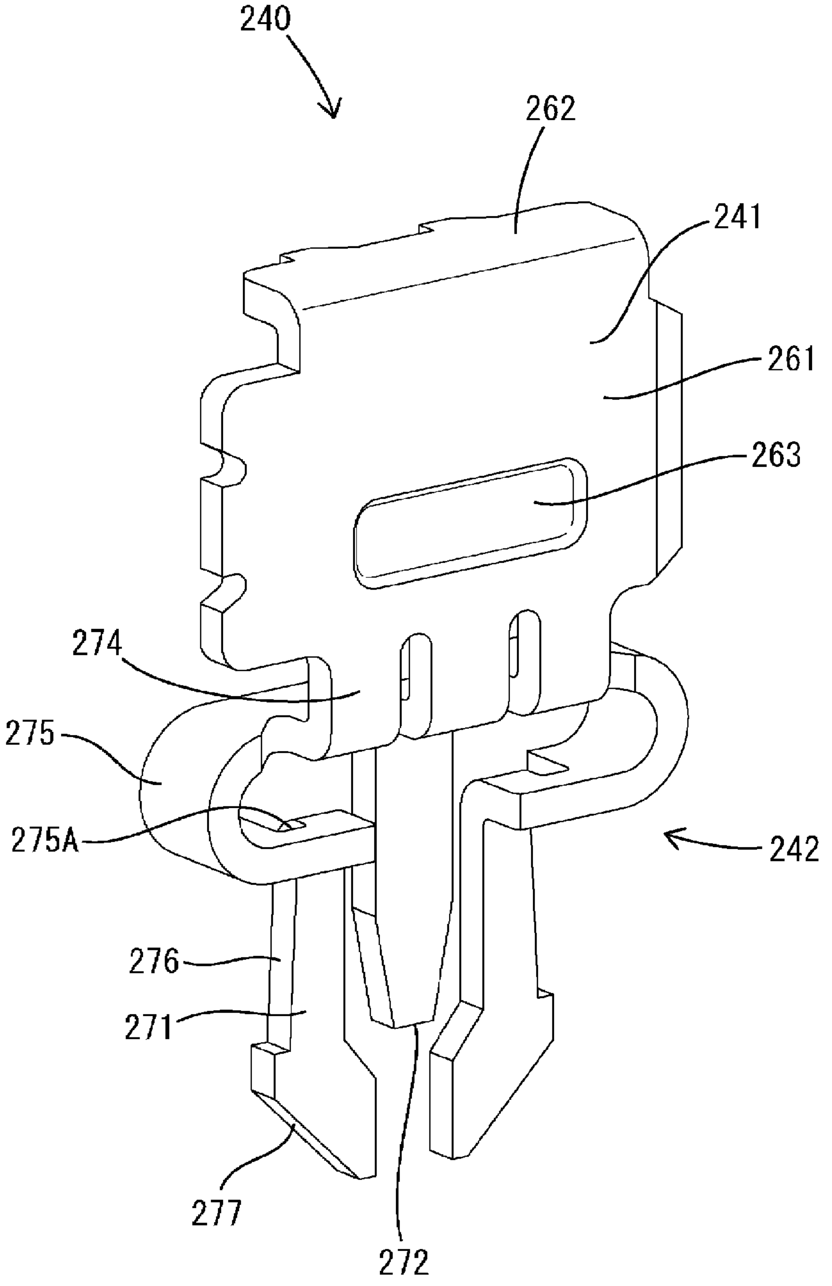
FIG. 17 is a perspective view of the fixing member when viewed from a laterally inner side.

As shown in FIGS. 16 and 17, the fixing member 240 is made of metal and integrally formed. As shown in FIG. 15, a pair of the fixing members 240 are respectively mounted on both left and right sides of the housing 220. The fixing member 240 is fixed to the circuit board 12 and fixes the housing 220 to the circuit board 12.

As shown in FIGS. 16 and 17, the fixing member 240 includes a mounting portion 241 and a fixing portion 242. The mounting portion 241 is a part to be mounted on the housing 220. The mounting portion 241 includes a plate portion 261 and an upper edge portion 262. The plate portion 261 is a plate extending along the vertical direction and lateral direction. A fixing member-side protrusion 263 projecting laterally inward (toward the other fixing member 240 in a state mounted on the housing 220) is provided at a position slightly below a central part of the plate portion 261. The upper edge portion 262 extends laterally inward (in the same direction as a projecting direction of the fixing member-side protrusion 263) from the upper end of the plate portion 261. A pair of projecting pieces 264 projecting in the same direction as an extending direction of the upper edge portion 262 are provided on the tip of the upper edge portion 262. The pair of projecting pieces 264 are provided apart in the front-rear direction.

The fixing portion 242 is inserted into and fixed in a hole 14 provided in the circuit board 12. As shown in FIGS. 16 and 17, the fixing portion 242 includes a pair of hooking pieces 271 and an extending portion 272. The hooking piece 271 includes a base end portion 274, a deforming portion 275 and a hooking portion 276. The base end portion 274 extends downward from the lower of the mounting portion 241 (specifically, the plate portion 261). The deforming portion 275 is bent to extend laterally inward (toward an extending side of the upper edge portion 262) and be convex outward in the front-rear direction (toward a side opposite to the other deforming portion 275). The hooking portion 276 extends downward from the tip (lower end) of the deforming portion 275. A slit 275A is provided between the tip (lower end) of the deforming portion 275 and the base end (upper end) of the hooking portion 276. A wide portion 277 wider than the other parts (parts closer to the base end than the tip) is provided on the tip of the hooking portion 276. The lower edge of the wide portion 277 is inclined inward in the front-rear direction (toward the other hooking portion 276) toward a lower side.

The extending portion 272 is provided between the pair of hooking pieces 271. The extending portion 272 extends downward from the lower end of the mounting portion 241 (specifically, the plate portion 261) between the pair of hooking pieces 271. The extending portion 272 extends downward, is then bent laterally inward (toward the extending side of the upper edge part 262) and further extends downward. The tip of the extending portion 272 is located between the pair of hooking pieces 271. The extending portion 272 can suppress excessive deflection of the hooking piece 271 by interfering with the hooking piece 271 deflected inward in the front-rear direction (toward the other hooking piece 271).

(Fixing Structure of Fixing Member)

The fixing member 240 is mounted on the housing 220 as shown in FIGS. 18 to 20 by being press-fit into the fixing groove 250 from front. The upper edge portion 262 is press-fit into the upper groove 251. The pair of projecting pieces 264 contact a wall surface (back surface) 251A on a laterally inner side of the upper groove 251. The plate portion 261 is press-fit into the central groove 252. The fixing member-side protrusion 263 contacts the housing-side protrusion 254. The fixing portion 242 is arranged in the lower groove 253. A lower end side of the fixing member 240 projects further downward than the lower end surface of the housing 220 as shown in FIG. 21.

(Fixing of Board Connector to Circuit Board)

First, the board connector 210 is prepared. Specifically, the terminal fittings 30 and the fixing members 240 are mounted in or on the housing 220 as shown in FIG. 21.

Figure 22:
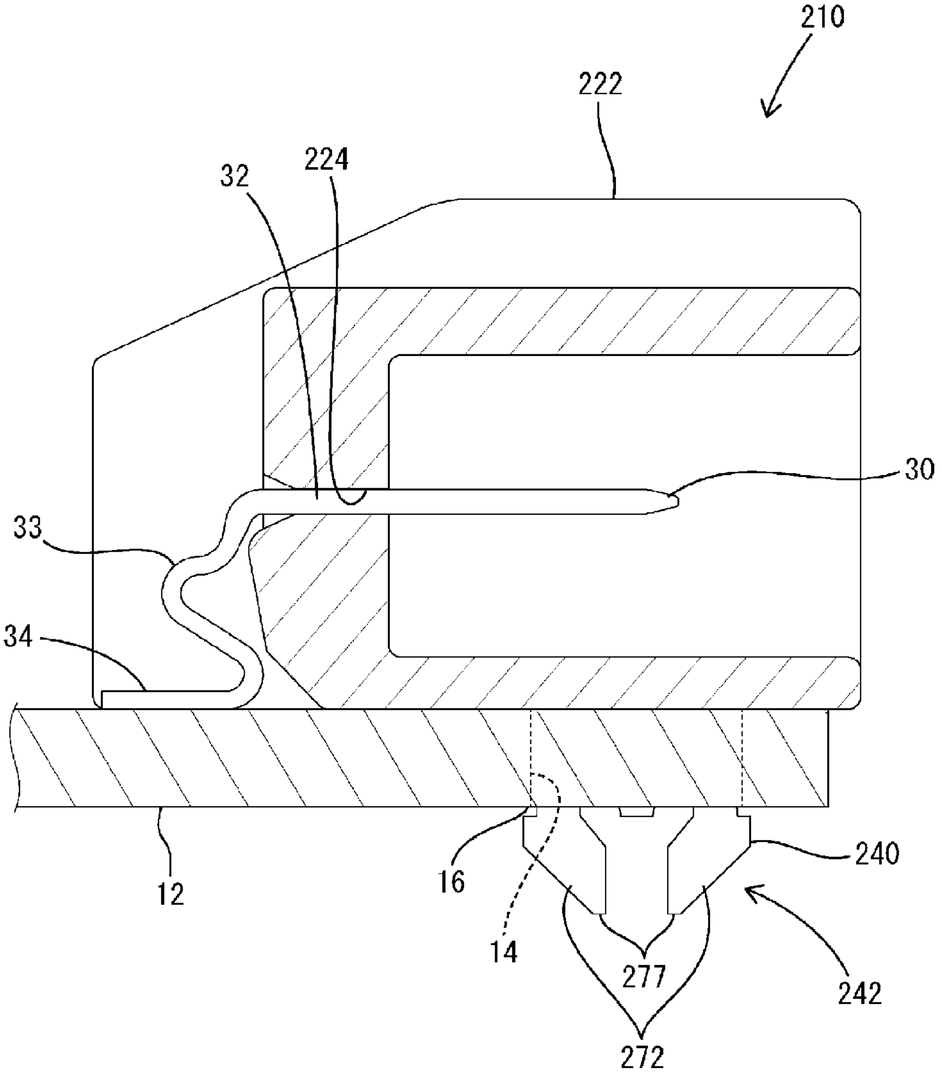
FIG. 22 is a side view in section showing a state where the board connector is fixed to the circuit board.

Subsequently, as shown in FIG. 22, the board connector 210 is placed on the upper surface of the circuit board 12 by inserting the pairs of hooking pieces 271 into the holes 14. The pair of hooking pieces 271 are resiliently deformed in directions toward each other in an insertion process into the hole 14. The lower edges of the wide portions 277 are guided by the hole 14 and enter the hole 14. The wide portions 277 pass through the hole 14. The pair of hooking pieces 271 are fixed by being hooked to a lower edge part 16 of the hole 14 based on restoring forces. By hooking the wide portions 277 to the lower edge part 16 of the hole 14, the fixing member 240 is prevented from coming out from the hole 14.

The connecting portions 34 of the terminal fittings 30 are pressed against the circuit board 12 based on restoring forces of the resiliently deformed resilient portions 33 as shown in FIG. 22. Thus, by releasing a fixed state by the fixing members 240, the connecting portions 34 can be easily removed from the circuit board 12.

The pair of hooking pieces 271 are resiliently deformed in the directions toward each other in the insertion process and fixed by being hooked to the edge part 16 of the hole 14 based on the restoring forces. Since the fixing member 240 is fixed to the housing 220 using the restoring forces of the resilient deformation of the pair of hooking pieces 271 as just described, fixing by soldering or the like is not necessary. Thus, the connector 210 can be easily removed from the circuit board 12 by resiliently deforming the pairs of hooking pieces 271 and removing the fixing members 240 from the holes 14.

Other Embodiments

The present invention is not limited to the above described and illustrated embodiments, but is represented by claims. The present invention is intended to include all changes in the scope of claims and in the meaning and scope of equivalents and also include the following embodiments.

Although the terminal fitting 30 is configured as a male terminal fitting in the above first and second embodiments, the terminal fitting 30 may be a female terminal fitting.

Although the terminal fitting 30 includes three bent portions (first bent portion 33A, second bent portion 33B and third bent portion 33C) in the above first and second embodiments, there is not limitation to such a shape. The terminal fitting 30 may be, for example, bent into a crank shape.

In the second embodiment, the pair of fixing members 240 may be provided at positions overlapping the plurality of connecting portions 34 in the alignment direction (lateral direction) of the plurality of terminal fittings 30.

LIST OF REFERENCE NUMERALS

10 board connector
12 . . . circuit board
14 . . . hole

16 . . . edge part
20 . . . housing
21 . . . receptacle
22 . . . back wall
23 . . . fitting portion
24 . . . back wall hole
30 . . . terminal fitting
31 . . . tab portion
32 . . . support receiving portion
33 . . . resilient portion
33A . . . first bent portion
33B . . . second bent portion
33C . . . third bent portion
34 . . . connecting portion
40 . . . fixing member
41 . . . mounting portion
41A . . . upper plate portion
41B . . . first folded piece
41C . . . lower plate portion
41D . . . second folded piece
41E . . . side plate portion
42 . . . fixing portion
43 . . . hooking piece
43A . . . base end portion
43B . . . deforming portion
43C . . . hooking portion
43D . . . third folded piece
50 . . . supporting member
51 . . . attaching portion
51A . . . hooking piece
51B . . . folded portion
51C . . . upper edge portion
51D . . . through hole
51E . . . bent piece
51F . . . bulging portion
51G . . . edge portion
51H . . . upper edge
52 . . . penetrating portion
53 . . . first plate
53A . . . arm portion
54 . . . second plate
55 . . . bent portion
55A . . . pressure receiving portion
55B . . . pressure receiving surface
55C . . . bridge portion
60 . . . fixing groove
61 . . . first groove
62 . . . second groove
63 . . . third groove
64 . . . recess
210 . . . board connector
220 . . . housing
221 . . . receptacle
222 . . . back wall
223 . . . fitting portion
224 . . . back wall hole
240 . . . fixing member
241 . . . mounting portion
242 . . . fixing portion
250 . . . fixing groove
251 . . . upper groove
251A . . . wall surface (back surface)
252 . . . central groove
253 . . . lower groove
254 . . . housing-side protrusion
261 . . . plate portion
262 . . . upper edge portion
263 . . . fixing member-side protrusion
264 . . . projecting piece
271 . . . hooking piece
272 . . . extending portion
274 . . . base end portion
275 . . . deforming portion
275A . . . slit
276 . . . hooking portion
277 . . . wide portion

What is claimed is:

1. A board connector to be fixed to a circuit board, comprising:

a terminal fitting; and a housing, the terminal fitting being mounted in the housing, the terminal fitting including:

a support receiving portion to be supported by the housing;

a connecting portion to be connected to the circuit board; and a resiliently deformable resilient portion provided between the support receiving portion and the connecting portion, and the connecting portion being pressed against the circuit board based on a restoring force of the resiliently deformed resilient portion, wherein the resilient portion includes:

a first bent portion bent to be convex toward a front-lower side;

a second bent portion bent to be convex rearward; and a third bent portion bent to be convex forward, and wherein the first bent portion extends downward from a rear end of the support receiving portion.

2. The board connector of claim 1, comprising a fixing member to be mounted on the housing directly or via another member, the fixing member being fixed to the circuit board, the fixing member fixing the housing to the circuit board, wherein:

the fixing member includes:

a mounting portion to be mounted on the housing directly or via the other member; and a fixing portion to be inserted into and fixed in a hole provided in the circuit board, the fixing portion includes a pair of hooking pieces resiliently deformable by being inserted into the hole, and the pair of hooking pieces are fixed by being resiliently deformed in directions toward each other in an insertion process and being hooked to an edge part of the hole based on restoring forces.

3. The board connector of claim 2, comprising a supporting member to be mounted on the housing, the supporting member supporting the fixing member, wherein:

the supporting member includes a penetrating portion projecting toward a side opposite to the housing by being passed through the hole, a pressure receiving surface facing toward the circuit board is provided on a projecting end part of the penetrating portion, and the hooking pieces contact the circuit board and the pressure receiving surface of the penetrating portion based on restoring forces by resilient deformation of the hooking pieces.

4. The board connector of claim 2, wherein:

a plurality of the terminal fittings are mounted side by side along an alignment direction in the housing, and the fixing member is provided at a position overlapping a plurality of the connecting portions in the alignment direction.

5. The board connector of claim 1, wherein the support receiving portion is wider in a lateral direction than the resilient portion.

* * * * *